(12) United States Patent
Kokeguchi et al.

(10) Patent No.: US 7,344,763 B2
(45) Date of Patent: Mar. 18, 2008

(54) DISPLAY MEDIUM

(75) Inventors: Noriyuki Kokeguchi, Kokubunji (JP); Satoru Ikesu, Fuchu (JP)

(73) Assignee: Konica Minolta Holdings, Inc. (JP)

( * ) Notice: Subject to any disclaimer, the term of this patent is extended or adjusted under 35 U.S.C. 154(b) by 207 days.

(21) Appl. No.: 11/209,114

(22) Filed: Aug. 22, 2005

(65) Prior Publication Data

US 2006/0045991 A1 Mar. 2, 2006

(30) Foreign Application Priority Data

Aug. 25, 2004 (JP) ............................. 2004-244794

(51) Int. Cl.
*C09K 19/52* (2006.01)
*C09K 19/54* (2006.01)
*C09K 19/60* (2006.01)

(52) U.S. Cl. ........................ 428/1.1; 428/1.3; 428/1.31; 252/299.01; 252/299.1; 252/299.5

(58) Field of Classification Search ........... 252/299.01, 252/299.1, 299.5; 428/1.1, 1.3, 1.31, 411.1
See application file for complete search history.

(56) References Cited

U.S. PATENT DOCUMENTS

| 6,618,102 B2 * | 9/2003 | Harada et al. ............... 349/78 |
| 6,704,073 B2 * | 3/2004 | Stephenson et al. ......... 349/86 |
| 2001/0009417 A1 | 7/2001 | Asai et al. |
| 2001/0040542 A1 * | 11/2001 | Harada et al. ............... 345/87 |
| 2004/0046036 A1 | 3/2004 | Koshimizu et al. |

FOREIGN PATENT DOCUMENTS

| EP | 1 195 423 A1 | 4/2002 |
| EP | 1 239 324 A2 | 9/2002 |
| EP | 1 347 329 A1 | 9/2003 |
| JP | 07-287214 | 10/1995 |
| JP | 09-218421 | 8/1997 |
| JP | 2000-098326 | 4/2000 |
| JP | 2001-154219 | 6/2001 |
| JP | 2003-302625 | 10/2003 |

OTHER PUBLICATIONS

European Search Report for Application No. GB0516793.7 mailed Jan. 17, 2006.

* cited by examiner

*Primary Examiner*—Shean C Wu
(74) *Attorney, Agent, or Firm*—Cantor Colburn LLP

(57) ABSTRACT

A rewritable display containing a substrate having thereon one or more constitution layers, one of the constitution layers being a liquid crystal layer containing a liquid crystal composition which is dispersed in a binder, and one of the constitution layers containing a compound selected from the group constituted of: (a) alumina particles; (b) a layer structured inorganic compound; (c) a specific azomethine dye compound represented by Formula (D) whose structure is described in the specification; (d) a fluorescent brightening agent; and (e) a ultraviolet absorber.

14 Claims, 6 Drawing Sheets

DISPLAY MEDIUM

This application is based on Japanese Patent Application No. 2004-244794 filed on Aug. 25, 2004 in Japanese Patent Office, the entire content of which is hereby incorporated by reference.

TECHNICAL FIELD

The present invention relates to a display medium, especially to a rewritable display which contains a binder and a liquid crystal composition dispersed in a binder.

BACKGROUND

In recent years, in accordance with increase of operational speed of a personal computer, popularization of a network infrastructure, and realization of larger capacity and lower cost of data storage, chance to receive and inspect information such as documents and images, which are conventionally provided as printed matter on paper, as more convenient electronic information is more and more increasing.

As an inspection means of such electronic information, conventionally, an emission type such as a liquid crystal display, a CRT and a newly coming organic EL display is primarily utilized, however, it is necessary to gaze steadily an inspection means for a relatively long period of time, particularly, in the case of electronic information being document information, behavior of which is not necessarily a gentle means for human being. Generally, as disadvantages of an emission type display, there have been known such as, exhausting of eyes with a flicker, inconvenience for carrying, limitation of a reading pose, necessity to focus eyes onto a still image plane, and increased electricity consumption for long time reading.

As a display means to compensate these disadvantages, known is a reflection type display, which utilizes outside light and consumes no electricity to retain images (memory capability). Among reflection type displays, a method, in which a liquid crystal composition is made into an oil droplet form to be dispersing held in a binder, is called as polymer dispersion type liquid crystal or scattered type liquid crystal, and various types thereof are known (for example, refer to patent literatures 1-4).

The inventors of this invention, as a result of detailed examination of techniques disclosed in the above-described patent literatures, have found that image display is surely possible by utilizing an optical scattering state and an optical transparent state; however, conventional techniques exhibit a lower contrast to cause a problem in optical characteristics.

[Patent Literature 1] JP-A No. 2003-302625 (Hereinafter, JP-A refers to Japanese Patent Publication Open to Public Inspection)

[Patent Literature 2] JP-A No. 7-287214

[Patent Literature 3] JP-A No. 9-218421

[Patent Literature 4] JP-A No. 2000-98326

SUMMARY

This invention has been made in view of the above-described problems and an embodiment is, in a display medium having memory capability, to provide a display medium which has been improved in optical characteristics particularly in a contrast ratio.

The problems described above have been solved by the following constitutions.

(1) An aspect of the present invention includes a rewritable display comprising a substrate having thereon one or more constitution layers, one of the constitution layers being a liquid crystal layer containing a liquid crystal composition which is dispersed in a binder, and one of the constitution layers containing a compound selected from the group constituted of:

(a) alumina particles;

(b) a layer structured inorganic compound;

(c) an azomethine dye compound represented by

Formula D:

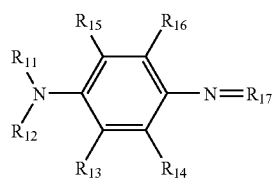

wherein $R_{11}$ to $R_{17}$ is a hydrogen atom or a substituent, (d) a fluorescent brightening agent; and (e) a ultraviolet absorber.

(2) Another aspect of the present invention includes a rewritable display, wherein the liquid crystal composition is a chiral nematic liquid crystal composition having a cholesteric phase.

(3) Another aspect of the present invention includes a rewritable display, wherein the chiral nematic liquid crystal composition selectively reflects one of lights selected from the group consisting of blue light, green lights red light and yellow light.

(4) Another aspect of the present invention includes a rewritable display, wherein the chiral nematic liquid crystal composition exhibits selective reflection of dextrorotary or levorotatory.

(5) Another aspect of the present invention includes a rewritable display, wherein the liquid crystal layer comprises a plurality of liquid crystals.

(6) Another aspect of the present invention includes a rewritable display, comprising a multiplicity of liquid crystal layers on the substrate.

(7) Another aspect of the present invention includes a rewritable display, wherein the liquid crystal composition is encapsulated with a microcapsule wall.

(8) Another aspect of the present invention includes a rewritable display, further comprises a pair of counter electrodes which sandwich the liquid crystal layer therebetween.

(9) Another aspect of the present invention includes a rewritable display, further comprises a light shielding layer.

(10) Another aspect of the present invention includes a rewritable display, wherein the light shielding layer is provided between the pair of counter electrodes.

(11) Another aspect of the present invention includes a rewritable display, wherein at least one of the counter electrodes is formed by an electrostatic induction ink-jet apparatus having a nozzle diameter of not more than 30 µm.

In a display medium provided with a memory capability, this invention can provide a display medium having an improved contrast ratio.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

Figure 1:
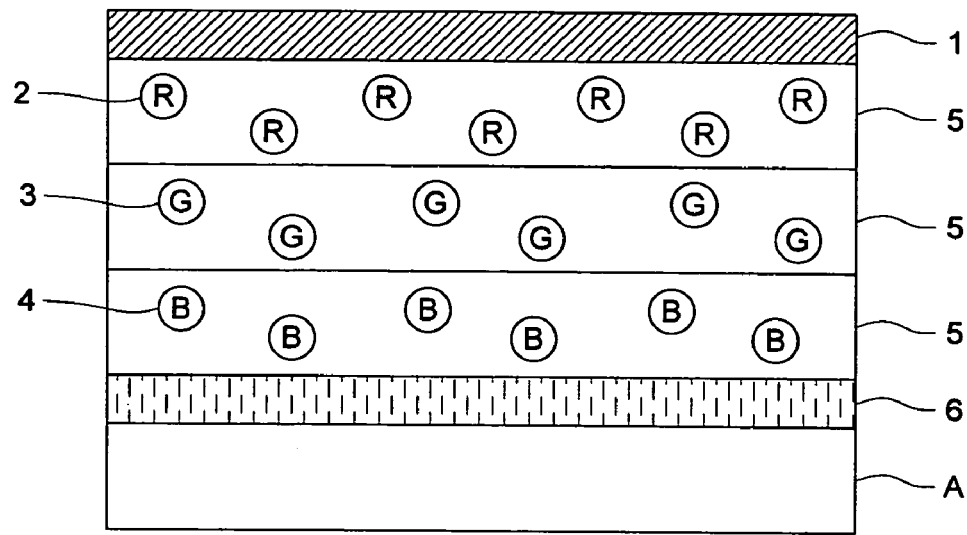
FIG. 1 is a cross-sectional drawing to show a constitution example of a color display medium provided with a plural number of constitution layers containing a dispersed liquid crystal compound.
Figure 1:
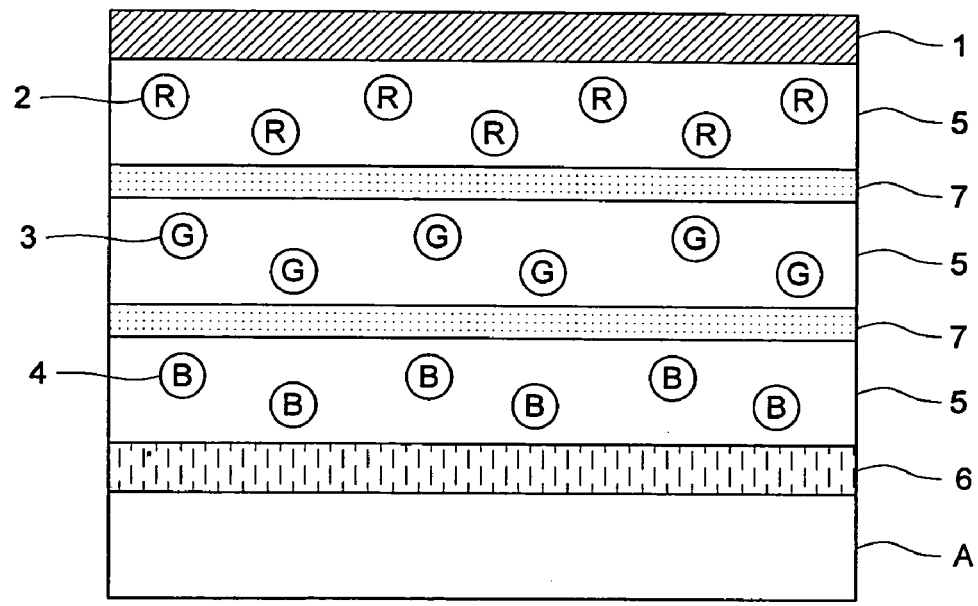

In the following, the most preferable embodiment to practice this invention will be detailed.

The inventors have found that a display medium (more specifically a rewriteable display) having an improved contrast ratio, in a display medium provided with a memory capability, can be realized by a display medium which is provided with at least one substrate and constitution layers including at least one liquid crystal layer containing a liquid crystal composition dispersed in a binder, wherein any of (a) alumina particles, (b) a layer-form inorganic compound, (c) an azomethine dye compound represented by above-described Formula (D), (d) a fluorescent whitening agent and (e) a UV absorbent is incorporated in at least one constitution layer; resulting in achievement of this invention.

In the following, a display medium of this invention will be detailed.

A display medium of this invention is provided with at least one substrate and constitution layers including at least one liquid crystal layer containing a liquid crystal composition dispersed in a binder. The constitution layers may include a plural number of layers such as an intermediate layer containing no liquid crystal composition but a binder, a filter layer containing such as dyes and a light shielding layer, in addition to a liquid crystal layer containing a dispersed liquid crystal composition.

[Binder]

As a binder employed in a display medium of this invention, a hydrophilic binder is preferably utilized. Examples thereof include binders described in Research Disclosure (hereinafter abbreviated as RD) vol. 176, Item/17643 (December, 1978) and RD vol. 308, Item/308119 (December, 1989); and those described in pp. 71-75 of JP-A No. 64-13546.

Further, binders suitable for this invention are transparent or translucent, and are generally colorless, including natural polymer, synthetic resin, polymer and copolymer, in addition to film forming media; such as gelatin, gum arabi, poly(vinyl alcohol), hydroxyethyl cellulose, cellulose acetate, cellulose acetate butyrate, poly(vinyl pyrrolidone), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetal) series (such as poly(vinyl formal) and poly(vinyl butyral)), poly(ester)s, poly(urethane)s, phenoxy resin, poly(vinilidene chloride), poly(epoxide)s, poly(carbonate)s, poly(vinyl acetate), cellulose esters and poly(amide)s. Either hydrophilic or hydrophobic binders may be applicable, however, in this invention, a hydrophobic transparent binder can be also utilized in a range of not being miscible with a liquid crystal composition. Hydrophobic transparent binders include such as polyvinyl butyral, cellulose acetate, cellulose acetate butyrate, polyester, polycarbonate, polyacrylic acid and polyurethane. Among the hydrophobic binders, particularly, polyvinyl butyral, cellulose acetate, cellulose acetate butyrate and polyester are preferably utilized.

These binders may be utilized in combination of at least two types, and the coating amount of a binder is preferably not more than 100 g and specifically preferably not more than 20 g, per 1 $m^2$.

Binders according to this invention is important, specifically in the case of utilizing opposing electrodes, to secure film strength of a dispersion type liquid crystal layer, and although a resin support structure or spacer particles can be employed together with a binder to maintain a constant layer thickness, it is preferred not to utilize such means with respect to simple manufacturing processes. Further, gelatin is a preferable binder to obtain constitution layers having uniform layer thickness in each process of heating dissolution, coating, cooling set and drying, however, it is possible to employ processes similar to those of the aforesaid gelatin by utilizing polyvinyl alcohols in combination with viscosity increasing polysuccharides such as carrageenan and Gellan gum, as an example other than gelatin; and constitution layers having uniform layer thickness can be also obtained in this case.

In addition to these, binders utilized in this invention include water-based solvent dispersion such as polyurethane resins, polyacrylic resins and silicone resins; photo-curable resin, heat-curable resin and thermoplastic resin.

In a display medium of this invention, at least one type of binders is preferably gelatin or a gelatin derivative.

Gelatin utilized in this invention may be any of enzyme processed gelatin, which has been subjected to an enzyme treatment during the manufacturing process, and gelatin derivatives, that is, gelatin provided with an amino group, an imino group or a hydroxyl group in the molecule and being modified by treating with an agent which can react therewith, in addition to acid processed gelatin and alkali processed gelatin. General manufacturing methods of gelatin are well known and can be referred to descriptions, for example, in p. 55 of T. H. James: The Theory of Photographic Process 4th ed. (Macmillan), pp. 72-75 of Handbook of Scientific Photography (1st book) (Maruzen Co., Ltd.), and pp. 119-124 of Photographic Technology/Silver Salt Photography Edition (Corona Co., Ltd.).

In the case of utilizing gelatin as a binder in this invention, it is preferably hardened by a hardener, and examples of hardeners preferably utilized in this invention include those described in U.S. Pat. No. 4,678,739/column 41, and U.S. Pat. No. 4,791,042, JP-A Nos. 59-116655, 62-245261, 61-18942, 61-249054, 61-245153 and 4-218044. More specifically, listed are aldehyde type hardeners (such as formaldehyde), aziridine type hardeners, epoxy type hardeners, vinylsulfon type hardeners (such as N,N'-ethylene-bis(vinylsulfonylacetamide)ethane), N-methylol type hardeners (such as dimethylolurea), boric acid, metaboric acid or polymer hardeners (such as compounds described in such as JP-A No. 62-234157). Among these hardeners, vinylsulfon type hardeners or chlorotriazne type hardeners are preferably utilized alone or in combination. These hardeners are utilized at 0.001-1 g and preferably at 0.005-0.5 g, per 1 g of a binder.

In a display medium of this invention, at least one type of binders is preferably polyvinyl alcohol or a polyvinyl alcohol derivative which has been hardening processed.

Polyvinyl alcohol preferably utilized in this invention include modified polyvinyl alcohol such as polyvinyl alcohol the end of which is cationic modified and anionic modified polyvinyl alcohol provided with an anionic group, and polyvinyl alcohol derivatives in addition to ordinary polyvinyl alcohol which is prepared by hydrolysis of polyvinyl acetate.

The mean polymerization degree of polyvinyl alcohol obtained by hydrolysis of vinyl acetate is preferably not less than 1000 and specifically preferably 1500-5000. The saponification degree is preferably 70-100% and specifically preferably 80-99.5%. Cationic modified polyvinyl alcohols include, for example, polyvinyl alcohol having a primary to tertiary amino group or a quaternary ammonium group in the main chain or side chain of the polyvinyl alcohol as described in JP-A No. 61-10483, and these can be prepared by saponification of a copolymer of an ethylenic unsaturated monomer provided with a cationic group and vinyl acetate. Ethylenic unsaturated monomers provided with a cationic group include such as trimethyl-(2-acrylamido-2,2-dimethylethyl)ammonium chloride, trimethyl-(3-acrylamido-3,3-dimethylpropyl)ammonium chloride, N-vinylimidazole, N-vinyl-2-methylimidazole, N-(3-dimethylaminopropyl) methacrylamide, hydroxylethyltrimethyl ammonium chloride, N,N,N-trimethyl-(3-methacrylamidopropyl)ammonium chloride and N-(1,1-dimethyl-3-dimethylaminopropyl)acrylamide. The ratio of a cationic modifying group containing monomer in cationic modified polyvinyl alcohol is 0.1-10 mol % and preferably 0.2-5 mol %, against vinyl acetate. Anionic modified polyvinyl alcohols include, for example, polyvinyl alcohol having an anionic group as described in JP-A No. 1-206088, copolymers of vinyl alcohol and a vinyl compound provided with a water-soluble group as described in JP-A Nos. 61-237681 and 63-307979 and modified polyvinyl alcohol provided with a water-soluble group as described in JP-A No. 7-285265. Further, nonionic modified polyvinyl alcohol include, for example, polyvinyl alcohol derivatives in which a part of polyvinyl alcohol is added with a polyalkylene oxide group as described in JP-A No. 7-9758, block copolymers of a vinyl compound provided with a hydrophobic group and vinyl alcohol as described in JP-A No. 8-25795. Polyvinyl alcohol may be utilized also in combination of at least two types which are different in such as a polymerization degree and a modification type.

As hardeners to perform a hardening treatment of polyvinyl alcohol or a polyvinyl alcohol derivative contained in a display medium of this invention, boric acid and salt thereof can be utilized and further, in addition to these, compounds provided with a group reactive with a water-soluble binder or compounds accelerating a reaction between different groups, with which a water-soluble binder is provided, each other, are utilized by suitable selection depending on the type of a water-soluble binder. Specific examples of hardeners include, for example, epoxy type hardeners (such as glycidyl ethyl ether, ethyleneglycol diglycidyl ether, 1,4-butanediol diglycidyl ether, 1,6-diglycidyl cyclohexane, N,N-diglycidyl-4-glycidyl oxyaniline, solbitol polyglycidyl ether and glycerol polyglycidyl ether), aldehyde type hardeners (such as formaldehyde and glyoxal), active halogen type hardeners (such as 2,4-dichloro-4-hydroxy-1,3,5-s-triazine), active vinyl type hardeners (such as 1,3,5-trisacryloyl-hexahydro-s-triazne and bisvinylsulfonyl methyl ether) and aluminum alum. Boric acid and a salt thereof refers to oxygen acid, which is provided with a boron atom as the center atom, and a salt thereof and specifically include ortho-boric acid, di-boric acid, meta-boric acid, tetra-boric acid, penta-boric acid, octa-boric acid and salts thereof. Boric acid and salt thereof provided with a boron atom as hardeners may be utilized as an aqueous solution of alone or combination of at least two types. A mixed aqueous solution of boric acid and borax is specifically preferable. Boric acid and borax each can be added only as a relatively dilute aqueous solution; however, a concentrated aqueous solution can be prepared by mixing the both, resulting in preparation of a concentrated coating solution. Further, there is an advantage of relatively easy control of pH of the aqueous solution to be added. The addition amount of the above-described hardener is preferably 1-200 mg and more preferably 2-100 mg, per 1 g of the above-described water-soluble binder.

Further, this invention is characterized by that at least one type of aforesaid (a)-(e) as a contrast increasing compound is contained in the aforesaid binder without providing an interaction with the liquid crystal compound described later; which will be concretely explained in the following.

(Alumina Particles)

Alumina particles utilized in this invention include alumina such as aluminum oxide ($Al_2O_3$), pseude boehmite which is a hydrate of alumina ($Al_2O_3.nH_2O$, n=1-1.5), an alloy of alumina and silica (such as Zeeospheres™, manufactured by 3M Corp. (St. Paul, Minn.)). The size of alumina particles utilized in this invention is preferably 1-100 nm and more preferably 1-30 nm, as a mean equivalent circle diameter. Alumina particles of this invention may be provided with micro pores in one particle. The radius of micro pores is preferably 1-10 nm and more preferably 1.5-5 nm. The measurement of the radius of micro pores can be preformed by a nitrogen adsorption method. The preferable addition amount of alumina particles in a display medium is 1-800 mg per 1 g of a binder in a binder containing constitution layer of the display medium. The constitution layer containing alumina particles may either include a liquid crystal composition or not.

(Inorganic Layer Compound)

Inorganic layer compounds utilized in this invention include clay minerals such as synthetic mica, smectites, bentonite, hectorite, saponite, bedelite, nontronite, stevensite, videlite and monmolironite. These compounds may be provided with a swelling property to swell by inclusion of a solvent. Generally, layer compounds are characterized by being provided with a structure in which crystal structure units having a thickness of 1-1.5 nm are pilled, and containing a metal ion such as sodium, calcium, magnesium and lithium to compensate excess or shortage of charges in a crystal lattice.

An inorganic layer compound of this invention is preferably a synthetic mica compound, and specifically includes such as Na tetrasic mica: $NaMg_{2.5}(Si_4O_{10})F_2$, Na or Li taeniorite: $(NaLi)Mg_2(Si_4O_{10})F_2$ and Na or Li hectorite: $(NaLi)/3Mg_2/3Li_{1/3}(Si_4O_{10})F_2$.

The preferable size of synthetic mica is a thickness of 1-50 nm and a surface size of 1-20 μm, and the aspect ratio is not less than 100 and specifically preferably not less than 500.

The addition amount of an inorganic layer compound into a display medium of this invention is preferably 1-300 mg and more preferably 10-200 mg, per 1 g of a binder of a constitution layer containing a binder.

Inorganic layer compounds are generally liable to increase viscosity due to gel formation with a hydrophilic solvent, and play a role to increase gel strength, for example, when being utilized together with water-soluble polymer having a gelation temperature such as gelatin.

(Azomethine Dyes)

In a display medium of this invention, azomethine dye compounds, which are prepared from p-phenylene diamine and substituents thereof represented by following Formula (D) are generally utilized.

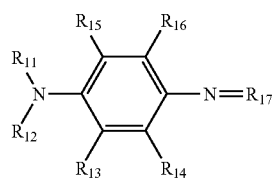

Formula (D)

wherein, $R_{11}$-$R_{17}$ represent a hydrogen atom or a substituent.

Substituents represented by $R_{11}$-$R_{17}$ are aliphatic groups, aromatic groups and heterocyclic groups; and aliphatic groups include an alkyl group, an alkenyl group and an alkynyl group; aromatic groups include each group of phenyl, tolyl and naphthyl; and heterocyclic groups include 5 and 6 member rings containing a hetero atom such as N, S and O, and hetero rings in which an aromatic ring is condensed therewith.

In the following, specific examples will be listed; however, compounds utilized in this invention are not limited thereto.

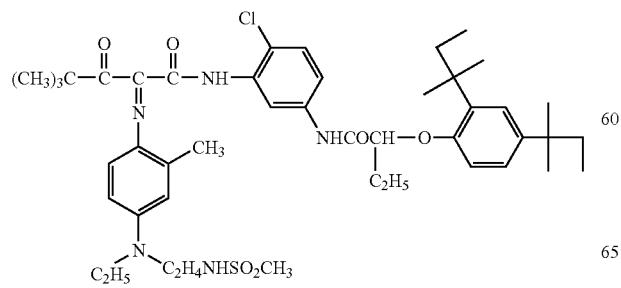
(D-1)

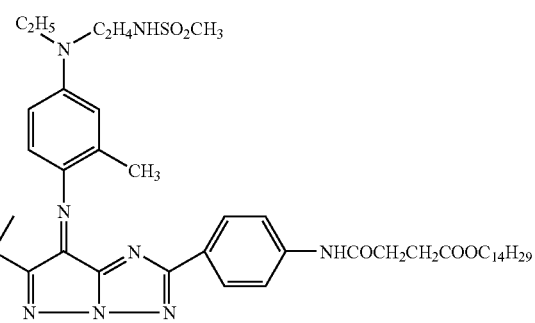
(D-2)

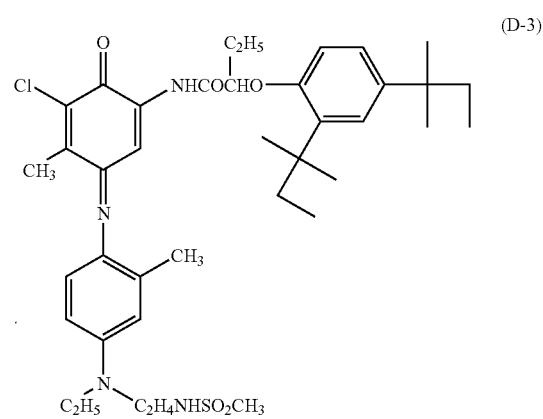
(D-3)

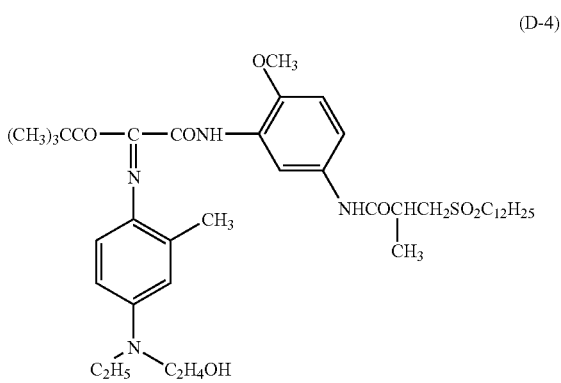
(D-4)

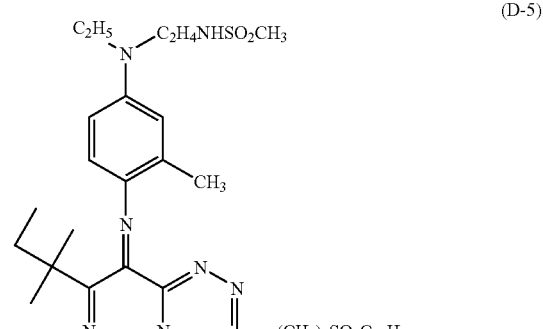
(D-5)

-continued (D-6)

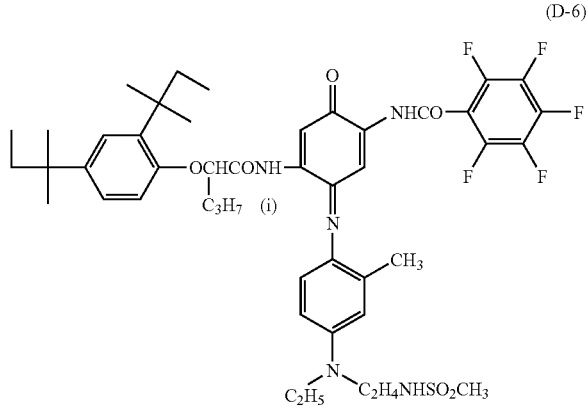

These azomethine dyes may function as a color modifier to adjust tone of the liquid crystal material described later or may form a filter layer or a black filter layer, by mixing with each color of yellow, magenta and cyan, and can be properly dispersed in a hydrophilic binder described later to exhibit excellent storage stability.

The content of a compound of Formula (D) in a display medium is preferably 0.01-10 g/m² and more preferably 0.1-5 g/m².

(Fluorescent Whitening Agent)

As a fluorescent whitening agent utilized in this invention, any type of compound provided it is essentially a water-insoluble micro-particle having a fluorescent whitening effect. Herein, to be essentially water-insoluble represents that solubility against 100 g of pure water is not more than 1.0 g.

As essentially water-insoluble micro-particles provided with a fluorescent whitening effect, ordinary water-insoluble fluorescent whitening agents can be utilized, however, in this invention, preferably utilized are essentially water-insoluble organic salts represented by following Formula [I] and more preferably utilized are essentially water-insoluble organic salts represented by following Formula [II].

$A^{n-}{}_n[B^+]$  Formula [I]

A represents a fluorescent whitening agent component having an anionic group such as a carboxyl group; B represents an organic cationic compound such as ammonium and pyridinium having a total carbon number of not less than 15; and n represents an integer of 1-9. Herein, a fluorescent whitening agent component provided with an anionic group are preferably substituted stilbene type fluorescent whitening agents, substituted cumalin type fluorescent whitening agents and substituted thiophene type fluorescent whitening agents, which are provided with an anionic group.

$C^{n-}{}_n[D^+]$  Formula [II]

C represents a fluorescent whitening agent component having a sulfonic acid group; D represents an organic cationic compound such as ammonium and pyridinium having a total carbon number of not less than 15; and n represents an integer of 1-9. Herein, a fluorescent whitening agent component provided with a sulfonic acid group are preferably substituted stilbene type fluorescent whitening agents, substituted cumalin type fluorescent whitening agents and substituted thiophene type fluorescent whitening agents, which are provided with a sulfonic acid group.

Fluorescent whitening agent components corresponding to A in Formula [I] and C in Formula [II] utilized in this invention can be synthesized by referring to such as "Fluorescent Whitening Agents", edited by Society of Chemicals Industry, British Patent No. 920,988, German Patent No. 1,065,838 and U.S. Pat. No. 2,610,152.

Compounds provided with a fluorescent whitening effect utilized in this invention can be synthesized by mixing fluorescent whitening agent components, corresponding to A in Formula [I] and C in Formula [II], and an organic cationic compound having a total carbon number of not less than 15 such as ammonium and pyridinium, corresponding to B in Formula [I] and D in Formula [II].

As an organic cationic compound, ammonium having a total carbon number of not less than 15 is preferably utilized.

As organic cationic compounds having a total carbon number of not less than 15, which correspond to B in Formula [I] and D in Formula [II] utilized in this invention, compounds represented by following Formula [III] are preferable.

$N^+(R_{21})(R_{22})(R_{23})(R_{24})$  Formula [III]

wherein, $R_{21}$, $R_{22}$, $R_{23}$ and $R_{24}$ each represent an alkyl group or a phenyl group, however, the sum of carbon numbers of $R_{21}$, $R_{22}$, $R_{23}$ and $R_{24}$ is preferably not less than 15 and more preferably not less than 20.

In the following, specific examples of essentially water-insoluble micro-particles provided with a fluorescent whitening effect will be listed; however, this invention is not limited thereto.

F-1

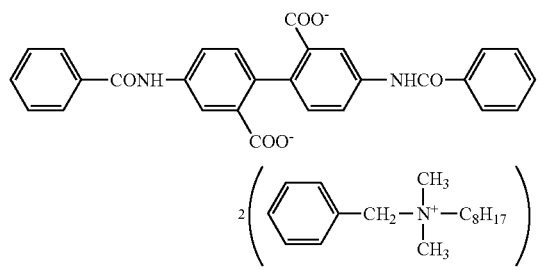

F-2

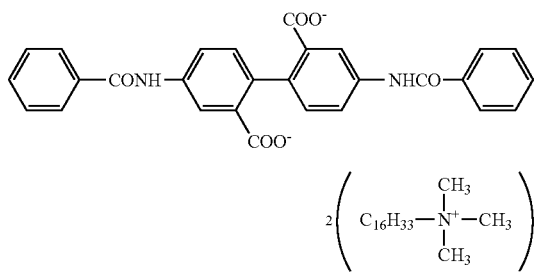

-continued
F-3
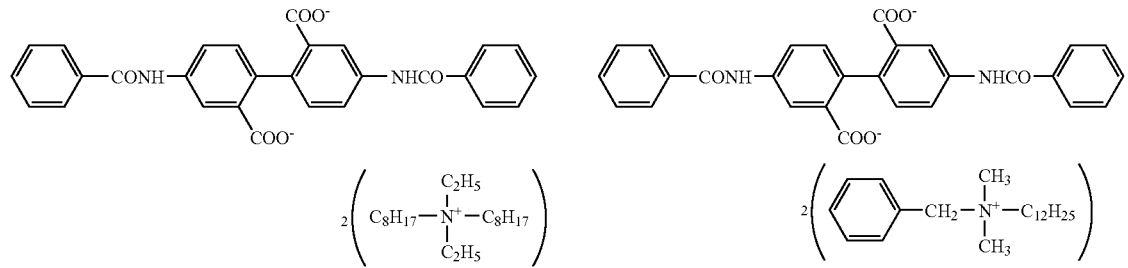
F-4
F-5
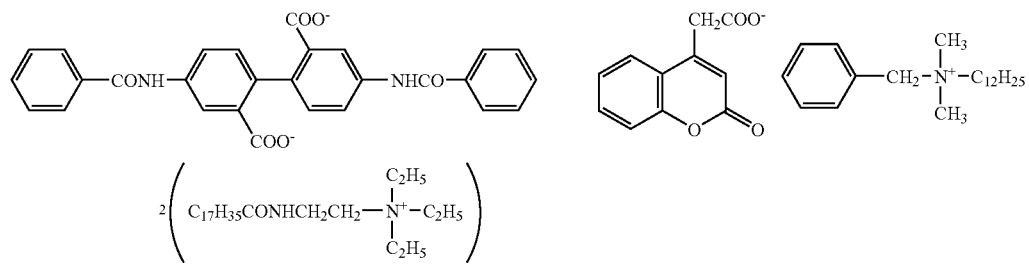
F-6
F-7
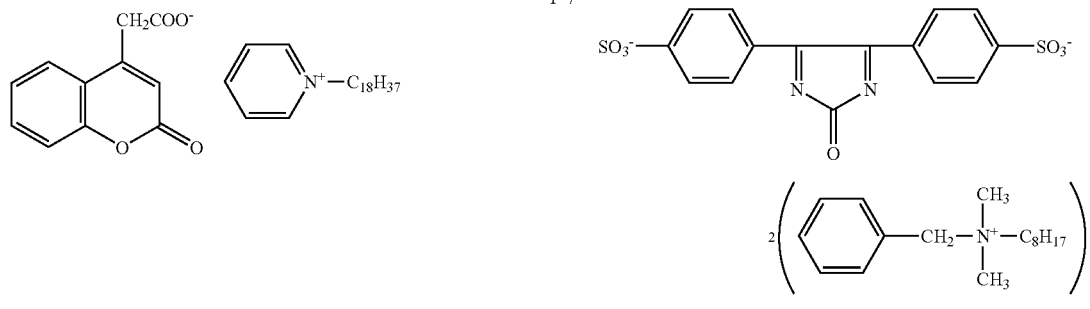
F-8
F-9
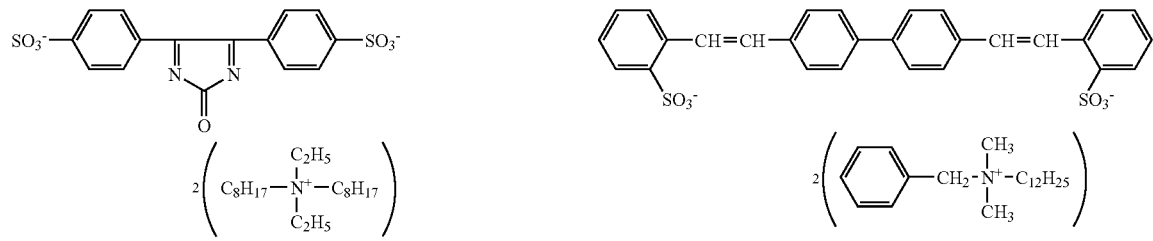
F-10
F-11
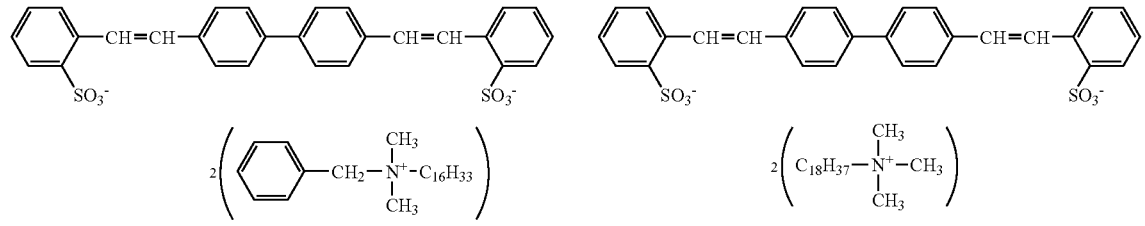
F-12

-continued
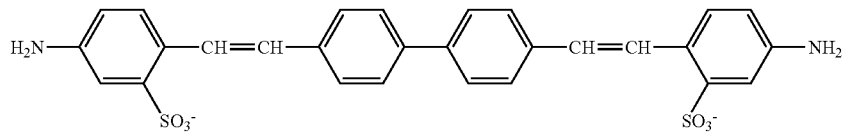
F-13
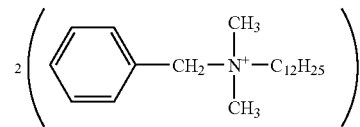
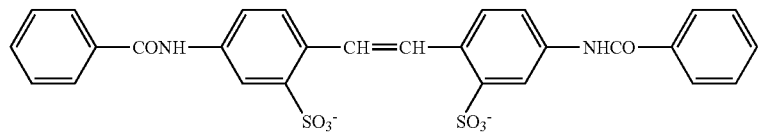
F-14
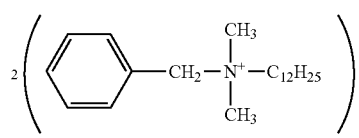
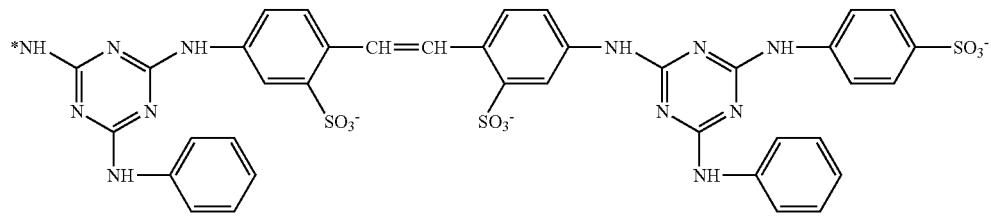
F-15
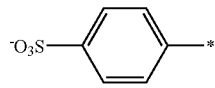
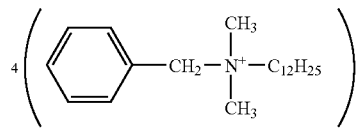
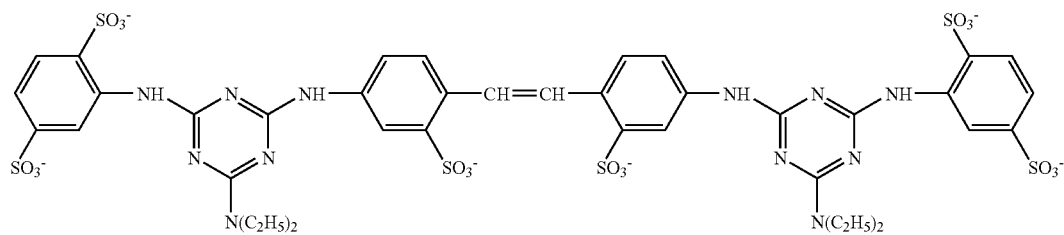
F-16
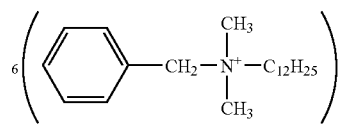
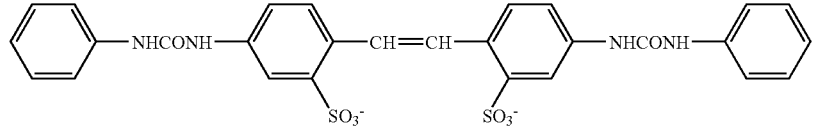
F-17
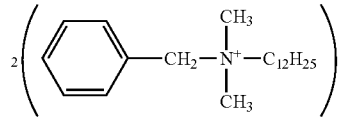

-continued

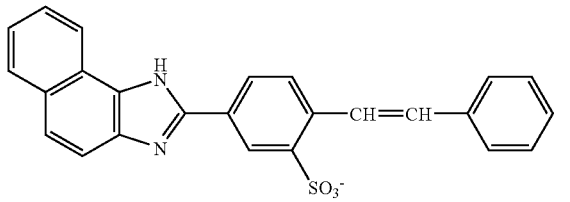
F-18

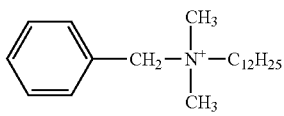

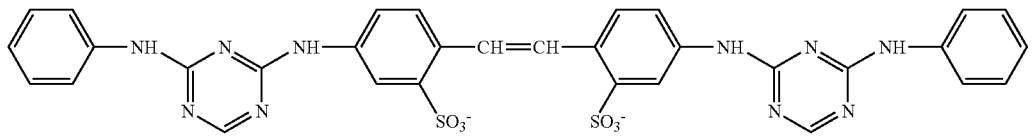
F-19

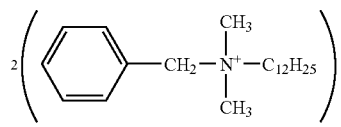

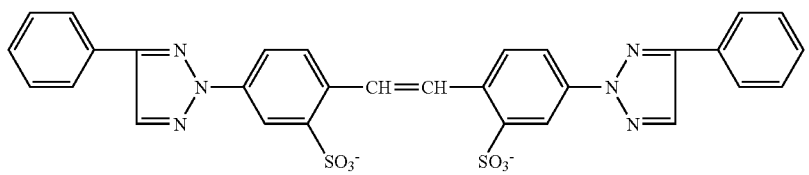
F-20

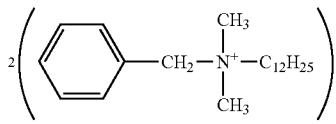

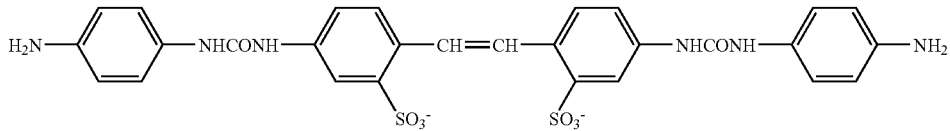
F-21

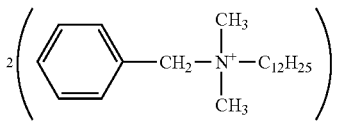

Micro-particles of this invention provided with a fluorescent whitening effect can be added as micro-particle dispersion.

The micro-particle dispersion method of a compound of this invention provided with a fluorescent whitening effect includes a method in which dispersion is performed into a hydrophilic colloidal aqueous solution of such as water or gelatin by use of a high speed stirring type homogenizer, a method in which dispersion is performed by being ground into a hydrophilic colloidal aqueous solution of such as water or gelatin by use of a ball mill or a sand mill, a method in which dispersion is performed into a hydrophilic colloidal aqueous solution of such as water or gelatin by use of a homogenizer having a high sharing force such as a Manton-Gaulin homogenizer, and a method in which dispersion is performed by use of an ultrasonic homogenizer.

At the time of dispersing micro-particles of this invention provided with a fluorescent whitening effect, a surfactant can be utilized for the purpose of increasing dispersibility and improving dispersion stability. Preferable surfactants include an anionic surfactant, a nonionic surfactant and a betaine type surfactant.

The mean particle diameter of micro-particles of this invention provided with a fluorescent whitening effect is 0.05-5 μm, preferably 0.1-2 μm and more preferably 0.2-1 μm.

The preferable addition amount of a fluorescent whitening agent of this invention into a display medium is 0.1-10 g/m² and more preferably 0.5-5 g/m².

(Ultraviolet Absorbent)

An ultraviolet absorbent may be incorporated in a constitution layer of a display medium of this invention.

Ultraviolet absorbents utilized in this invention are preferably compounds represented by following Formula (1) or (2).

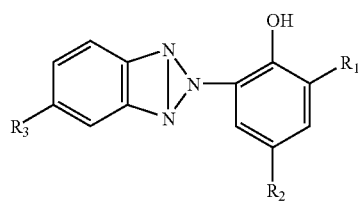

Formula (1)

wherein, $R_1$ and $R_2$ each represent an alkyl group which may be substituted, and $R_3$ represents a hydrogen atom, a halogen atom, an alkyl group or an alkoxy group.

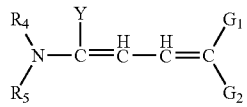

Formula (2)

wherein, $R_4$ and $R_5$ each represent an alkyl group, an aryl group or a cyclic alkyl group and may be identical to or different from each other. Y represents a hydrogen atom or an atomic group to form 5-member ring by bonding with $R_4$. $G_1$ and $G_2$ each represent an electron attracting group and may be identical to or different from each other.

In Formula (1), alkyl groups represented by $R_1$, $R_2$ and $R_3$ can be any alkyl group; however, at least one of them is preferably a tertiary or secondary alkyl group. Specifically, at least one of alkyl groups represented by $R_1$ and $R_2$ is preferably a tertiary or secondary alkyl group. Further, the sum of carbon numbers of an alkyl group portion of the above-described alkyl groups is preferably not more than 12. In the following, specific examples of compounds represented by Formula (1) will be shown.

| Example compounds No. | $R_1$ | $R_2$ | $R_3$ |
|---|---|---|---|
| 1-1 | —$CH_3$ | —$C_4H_9$(sec) | —H |
| 1-2 | —$C_4H_9$(sec) | —$C_4H_9$(t) | —$C_4H_9$(t) |
| 1-3 | —$C_4H_9$(sec) | —$C_4H_9$(t) | —$C_4H_9$ |
| 1-4 | —$C_4H_9$(sec) | —$C_4H_9$(t) | —$C_5H_{11}$(t) |
| 1-5 | —$C_4H_9$(sec) | —$C_4H_9$(t) | —$C_5H_{11}$ |
| 1-6 | —$C_4H_9$(sec) | —$C_5H_{11}$(t) | —$C_4H_9$(t) |
| 1-7 | —$C_4H_9$(sec) | —$C_5H_{11}$(t) | —$C_4H_9$ |
| 1-8 | —$C_4H_9$(t) | —$C_4H_9$(t) | —$C_4H_9$(sec) |
| 1-9 | —$C_5H_{11}$(t) | —$C_5H_{11}$(t) | —$C_4H_9$(sec) |
| 1-10 | —$C_4H_9$(t) | —$C_5H_{11}$(t) | —$C_4H_9$(sec) |
| 1-11 | —$C_4H_9$(sec) | —$C_4H_9$(sec) | —Cl |
| 1-12 | —$C_4H_9$(sec) | —$C_4H_9$(sec) | —$OCH_3$ |
| 1-13 | —$C_4H_9$(sec) | —$C_4H_9$(sec) | —$C_4H_9$(t) |
| 1-14 | —$C_4H_9$(sec) | —$C_4H_9$(sec) | —$C_4H_9$ |
| 1-15 | —$C_4H_9$(t) | —$C_2H_4COOC_8H_{17}$ | —H |
| 1-16 | —$C_4H_9$(t) | —$C_2H_4COOC_8H_{17}$ | —Cl |
| 1-17 | —$C_4H_9$(t) | —$C_2H_4COOCH_2CHC_4H_9$ \| $C_2H_5$ | —H |
| 1-18 | —$C_4H_9$(t) | —$C_2H_4COOCH_2CHC_4H_9$ \| $C_2H_5$ | —Cl |
| 1-19 | —$C_4H_9$(t) | —$(CH_2)_2COO(CH_2)_2OC_4H_9$ | —H |
| 1-20 | —$C_4H_9$(t) | —$C_2H_4COOC_2H_4OC_4H_9$ | —Cl |
| 1-21 | —$C_8H_{17}$ | —$CH_3$ | —H |
| 1-22 | —$C_{10}H_{21}$ | —$CH_3$ | —H |
| 1-23 | —$C_{12}H_{26}$ | —$CH_3$ | —H |
| 1-24 | —$C_{16}H_{33}$ | —$CH_3$ | —H |
| 1-25 | —$C_{20}H_{41}$ | —$CH_3$ | —H |
| 1-26 | —$C_{22}H_{45}$ | —$CH_3$ | —H |
| 1-27 | —$C_{24}H_{49}$ | —$CH_3$ | —H |

In Formula (2), $R_4$ and $R_5$ may be identical to or different from each other; alkyl groups include also a substituted alkyl groups (such as a cyanoalkyl group and an alkoxyalkyl group) and are provided with a carbon number of 1-10. Aryl groups include also a substituted aryl group and are provided with a carbon number of 6-20. When $R_4$ and $R_5$ are made into one group in combination, $R_4$ and $R_5$ represents an atomic group necessary to form a cyclic amino group such as piperizino group, a morpholino group, a pyrrolidino group, a hexahydroazepino group or a piperazino group. Electron attracting groups represented by $G_1$ and $G_2$ represent such as a cyano group, an alkoxycarbonyl group, a carbamoyl group or —$SO_2R$ (R represents an alkyl group or an aryl group). In the following, specific examples of compounds represented by Formula (2) will be shown.

-continued

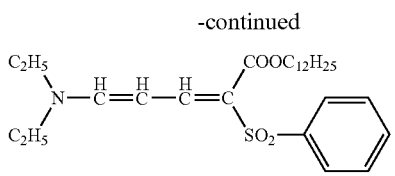

2-6

Herein, UV absorbers represented by Formulas (1) and (2) are preferably a liquid at ordinary temperature. Generally, hydrophobic compounds such as UV absorbers represented by Formulas (1) and (2) are applied in a binder of a display medium of this invention as an oil-in-water droplet type emulsion by use of a high boiling point organic solvent, however, the using amount is desired to be as small as possible because this high boiling point organic solvent may cause bleed out. When a hydrophobic compound utilized is liquid at ordinary temperature, it is advantageous with respect to bleed out because an emulsion can be formed without a high boiling point organic solvent.

As UV absorbers, compounds described in JP-A Nos. 58-152237, 63-65140, 3-175443 and 8-69087 can be utilized.

The addition amount of a UV absorbent into a display medium utilized in this invention is preferably 0.2-10 g/m² and more preferably 0.3-3 g/m².

Next, other constituent elements of a display medium of this invention will be explained.

[Substrate]

As a substrate utilized in this invention, for example, synthetic plastic film of polyolefins such as polyethylene and polypropylene, polycarbonates, cellulose acetate, polyethylene terephthalate, polyethylene dinaphthalene dicarboxylate, polyethylene naphthalates, polyvinyl chloride, polyimide, polyvinyl acetals and polystyrene can be also preferably utilized. Further, polystyrenes having a syndiotactic structure are also preferred. These can be prepared, for example, by a method described in each publication of JP-A Nos. 62-117708, 1-46912 and 1-178505. Further, listed are metal substrates such as stainless steel, paper supports such as baryta paper and resin coated paper, a support comprising the above-described plastic film on which a reflective layer is provided, and those described as supports in JP-A No. 62-253195 (pp. 29-31). Those described in p. 28 of RD No. 17643, p. 647 right column to p. 648 left column of RD No. 18716, and p. 879 of RD No. 307105 are also preferably utilized. These supports may be subjected to a thermal treatment of higher than Tg, as described in U.S. Pat. No. 4,141,735, to be made hard to suffer from core-set. Further, the surface of these supports may be subjected to a surface treatment for the purpose of improving adhesion between the support and other constitution layers. In this invention, a grow discharge treatment, an ultraviolet ray irradiation treatment, a corona treatment and a flame treatment can be employed as a surface treatment. Further, supports described in pp. 44-149 of Commonly Known Technologies No. 5 (published by Aztech Limited Co., Mar. 22, 1991) can be also utilized. In addition to these, listed are those described in p. 1009 of RD No. 308119 and item "Supports", vol. 92, p. 108 of Product Licensing Index. Other than these, can be utilized are glass substrates and epoxy resin in which glass are kneading blended.

[Liquid Crystal Composition]

A liquid crystal composition according to this invention is preferably a chiral nematic liquid crystal composition provided with a cholesteric phase.

Chiral nematic liquid crystal is a typical liquid crystal to exhibit a cholesteric phase, and prepared by adding a predetermined amount of a chiral material into nematic liquid crystal. This chiral nematic liquid crystal is generally provided with a twisted arrangement of bar-form liquid crystal to exhibit a cholesteric phase. When light is incident to this liquid crystal, light having a wavelength represented by $\lambda = np$ is selectively reflected (planer state) in the case of light is incident from the direction parallel to the helical axis. Herein, $\lambda$ is a wavelength, n is a mean refractive index of a liquid crystal molecule, and p is a distance at which the liquid crystal is twisted by 360°. On the other hand, light is transmitted without being reflected (focal conic state) in the case of light is incident from the direction perpendicular to the helical axis. Display is performed by utilizing these selective reflection and transmission.

An operation mode of reflection type liquid crystal display device provided with a memory capability is disclosed in SID International Symposium Digest of Technical Paper, vol. 29, p. 897. This operation mode is a method to perform display by converting the orientation state of chiral nematic liquid crystal into either a planer state (a selective reflection state of light) or a focal conic state (a transmission state of light). Since a planer state and a focal conic state each are stable states, when the liquid crystal has been once set to either state, the liquid crystal semi-permanently maintains the state unless outside force being applied. That is, this operation mode provides a useful reflective type display device provided with a memory capability which maintains the displayed image as it is even after cutting an electric source when the image has been once displayed.

A reflection type liquid crystal display medium described in the above literature has a constitution in which chiral nematic liquid crystal is maintained between a pair of substrates, each equipped with an electrode, and changes the liquid crystal into a predetermined state (a planer state and a focal conic state) by applying an electric field in the direction perpendicular to the substrates with electrodes to control strength and/or application time of the electric field.

When a voltage not less than the threshold voltage is applied for a sufficient time to release the twisted state of liquid crystal, liquid crystal all becomes into a homeotropic state (a state in which the long axis of a liquid crystal molecule is perpendicular against the substrate). Since this state has no memory capability, liquid crystal becomes into a twisted orientation when an electric field is erased. The homeotropic state is converted into a planer state in the case of an electric field being rapidly erased, while into a focal conic state in the case of an electric field being gradually erased.

Further, when a pulse voltage not less than the threshold voltage to release the twisted state (a voltage having a pulse width to make a part of liquid crystal in a homeotropic state) is applied to liquid crystal in a focal conic state, the liquid crystal having been converted into a homeotropic state is turned into a planer state after finishing application of the pulse voltage. It is possible to adjust the ratio at which liquid crystal is converted into a planer state (to display halftone) by controlling a width and/or height of pulse voltage.

In a liquid crystal-polymer complex film employing chiral nematic liquid crystal, by adjusting an amount of chiral dopant added in nematic liquid crystal to control a helical pitch of chiral nematic liquid crystal so that each selective reflection wavelength, for example, to be blue light, green light and yellow light, selected reflection state colored in red, green, blue and yellow are obtained in the case of a planer orientation, and to be a colorless transparent light transmission state in the case of a focal conic orientation. A color liquid crystal display device can be prepared by sandwiching and holding a liquid crystal-polymer complex film thus prepared between transparent electrodes. In a display medium of this invention, a chiral nematic liquid crystal composition is preferably constituted of a plural number of liquid crystal compositions which selectively reflect at least one type of light selected from blue light, green light, red light and yellow light.

Further, when a helical pitch of chiral nematic is adjusted so as to make a selective reflection wavelength of infrared light by adjusting the addition amount of a chiral dopant, a liquid crystal-binder complex film, which exhibits a colorless transmission state in a planer orientation while a whiter looking light scattering state due to isotropic light scattering in a focal conic orientation, can be prepared. A white display device is obtained by a liquid crystal-binder complex film thus prepared being sandwiching held between transparent electrodes.

Herein, the relationship between a helical pitch p (nm) and a selective reflection wavelength λ (nm) is represented by following equation (1).

$$\lambda = n \times p \qquad \text{Equation (1)}$$

wherein, n represents a mean refractive index and $n^2 = (n1^2 + n2^2)^{1/2}$. n1 represents a refractive index in the case of light being incident in the long axis direction of a liquid crystal molecule, and n2 represents a refractive index in the case of light being incident in the direction perpendicular to the long axis of a liquid crystal molecule.

To prepare a white display device or each color display device, applied can be a method in which a mixture of liquid crystal and a binder is sandwiching held between substrates, followed by being cured by such as a hardener, to phase separate liquid crystal and a binder. At this time, it becomes easy to control thickness of liquid crystal-binder complex film when a spacer together with the above-described mixture is sandwiching held between the substrates.

As a chiral dopant added in nematic liquid crystal, plural types of chiral dopants may be utilized in combination. Utilization of plural types of chiral dopants is effective to increase the phase transition temperature, to improve transparency of a complex film in a transparent state, and specifically to make rapid display conversion between a transparent state and a selective reflection state of a color display device.

As a color display device of a specific color, one of preferable embodiments of this invention is to utilize the first display device, provided with a complex film employing leve-rotatory chiral nematic liquid crystal, and the second display device, provided with a complex film employing dextro-rotatory chiral nematic liquid crystal which selectively reflects light of the same wavelength as the aforesaid leve-rotatory chiral nematic liquid crystal, being accumulated. By such a manner, it is possible to increase reflectivity as well as to perform an excellent color display. In particular, since the total color balance is improved by intensively displaying blue and red, which exhibit lower specific visual sensitivity compared to green, such a plural-layer constitution is effective for a blue color display device or a red color display device.

Smetic liquid crystal may be added in a liquid crystal-binder complex film utilized for a white display device. It is possible to improve transparency of a liquid crystal-binder complex film and to increase contrast between a colorless transparent state and a white state.

Herein, the thickness of a liquid crystal-binder complex film utilized in a display device of each color is not specifically limited; however, the thickness of a liquid crystal-binder complex film utilized in a white display device is preferably made larger than the thickness of a liquid crystal-binder complex film utilized in a color display device.

Specific compounds of a liquid crystal composition to show a cholesteric phase include compounds described in U.S. Pat. No. 5,695,682.

Other scattering type liquid crystal compositions include such as 4-substituted benzoic acid-4'-substituted phenylester, 2-(4-substituted phenyl)-5-substituted pyrimidine, 4-substituted cyclohexane carboxylate-4'-substituted biphenylester, 4-(4-substituted cyclohexyl)benzoic acid-4'-substituted phenylester, 4-substituted cyclohexane carboxylic acid-4'-substituted phenylester, 4-substituted biphenyl-4'-substituted cyclohexane, 4-(4-substituted cyclohexane carbonyloxy)benzoic acid-4'-substituted phenylester, 4-(4-substituted cyclohexyl)benzoic acid-4'-substituted phenylester, 4-(4-substituted cyclohexyl)benzic acid-4'-substituted cyclohexylester, 4-substituted-4"-substituted terphenyl, 4-substituted-4'-substituted biphenyl and 4-substituted phenyl-4'-substituted cyclohexane; in addition to liquid crystal compositions and liquid crystal compositions called as polymer network liquid crystal (PNLC) or polymer dispersion liquid crystal (PDLC) described in such as JP-A Nos. 2001-51260, 8-43846, 7-4950, 2000-147476, 8-160470, 10-54996, 2002-221709, 2001-92383, 2003-131234, 2004-77754 and 2004-2771.

In a display medium of this invention, a liquid crystal composition according to this invention is made to exist in a state of being dispersed in a binder. For example, after liquid crystal and a chiral agent according to this invention are mixed, this mixture is added in a gelatin solution containing such as a surfactant to be dispersed by use of a commonly known homogenizer, resulting in preparation of the aimed dispersion.

Surfactants utilized for dispersion described above include for example, aliphatic amine salt, aliphatic quaternary ammonium salt, benzalconium salt, benzetonium chloride, pyridinium salt and imidazolium salt, as ionic surfactants.

Anionic surfactants include, for example, aliphatic acid soap, N-acyl-N-methylglycine salt, N-acyl-N-methyl-β-alanine salt, N-acyl glutamate, acylated peptide, alkyl sulfonate, alkyl benzene sulfonate, alkyl naphthalene sulfonate, dialkyl sulfosuccinic ester, alkyl sulfoacetate, α-olefin sulfonate, N-acylmethyltaurine, sulfonated oil, higher alcohol sulfuric ester, secondary higher alcohol sulfuric ester, alkyl ether sulfate, secondary higher alcohol ethoxysulfate, polyoxyethylene alkylphenyl ether sulfate, monoglysulfate, aliphatic alkylolamide sulfuric ester, alkyl ether phosphoric ester, alkyl phosphoric ester, lignin sulfonate, a formalin condensate of naphthalene sulfonate, a formalin condensate of specific aromatic sulfonate (such as Mohr's C) and a formalin condensate of creosote oil sulfonate.

Amphoteric surfactants include such as a carboxy betaine type, a sulfo betaine type, aminocarboxylate and an imidazolynium betaine.

Nonionic surfactants include such as polyoxyethylene secondary alcohol ether, polyethylene alkylphenyl ether, polyoxyethylene sterol ether, polyoxyethylene lanolin derivatives, polyoxyethylene oxypropyrene alkylether, polyoxyethylene glycerin fatty acid ester, polyoxyethylene castor oil, hardened castor oil, polyoxyethylene sorbitol fatty acid ester, polyoxyethylene glycol fatty acid ester, fatty acid monoglycride, polyglycerin fatty acid ester, sorbitan fatty acid ester, propyreneglycol fatty acid ester, saccharose fatty acid ester, fatty acid alkanolamide, polyoxyethylene fatty acid amide, polyoxyethylene alkylamine, alkylamine oxide, acetylene glycol, acetylene alcohol, block copolymer of ethylene oxide and propylene oxide and an ethylene oxide adduct of alkylphenol.

For dispersion, such as a sharing type stirrer, a ball mill, a sand mill, an atliter, a roll mill, an agitator, a Henschel mixer, a colloidal mill, an ultrasonic homogenizer, a pearl mill, a wet type jet mill and a paint shaker can be utilized.

Next, a constitution of a display medium of this invention will be explained.

[Transparent Electrode]

A transparent electrode, as at least one of a pair of electrodes opposed to each other, is preferably utilized. A transparent electrode is not specifically limited provided being transparent and conductive, and utilized can be such as Indium Tin Oxide (ITO: indium tin oxide), Indium Zinc Oxide (IZO: indium zinc oxide), tin oxide (FTO), indium oxide, zinc oxide, platinum, gold, silver, rhodium, copper, chromium, carbon, aluminum, silicon, amorphous silicon, magnesium, BSO (Bismuth Silicon Oxide) and mixtures thereof. The mixture, for example, may be comprised of an accumulated structure of an ITO layer and a silver layer each having a thickness of 50 nm, respectively.

Further, polymer compounds such as of a polyolefin type, a polypyrrole type, a polyaniline type, a polyacetylene type, polyparaphenylene type and polyselenophenylene type, or conductive polymer of mixtures thereof can be utilized as a transparent electrode.

Further, it is possible to prepare a transparent electrode by coating a solution, in which ITO micro-particles having been burned at 350-800° C. are dispersed in a solution containing a solvent and a polymer material, on a substrate, and by evaporating the solvent or curing the polymer. In this case, the curing temperature of a coating solution is preferably not lower than 40° C. and not higher than 200° C. ITO micro-particles can be prepared, for example, as follows: A tin chloride aqueous solution and a indium chloride aqueous solution are mixed, a co-precipitation reaction being caused while keeping the pH at 9 with addition of such as ammonia, and the obtained precipitate of a hydroxide is separated, washed and burned at 500° C. for 2 hours. Micro-particles having an arbitrary mixing ratio can be formed by changing the mixing ratio of tin chloride and indium chloride. The form of micro-particles may be any of a granular form, a needle form, a tabular form and a flake form, and a mixture of such as a needle form and a granular form may be utilized.

Further, preferably utilized is a method in which a coating solution, comprising approximately 10% of an organo-indium compound and an organo-tin compound at a weight ratio of 97/3 blended in xylol, is coated on a substrate, followed by evaporation of the solvent and burning, at not lower than 100° C. and not higher than 150° C., resulting in being solidified.

In the coating solution described above, for the purpose of improving mechanical strength of an electrode, mixed may be a polymer compound, such as a polymer species which is capable of forming polyurethane resin containing blocked isocyanate, and a polymer species which is capable of forming epoxy resin.

The surface resistivity of a transparent electrode is preferably not more than 500 $\Omega/\square$ and specifically preferably not more than 300 $\Omega/\square$. Further, the film thickness is preferably not less than 0.2 μm and not more than 50 μm.

[Preparation Method of Electrode]

A commonly known method can be employed to form a transparent electrode and a metal electrode. For example, masked evaporation may be performed on a substrate by means of spattering, or patterning by means of photolithography may be performed after the whole surface film formation. Further, electrode formation is possible by means of electrolytic plating, non-electrolytic plating, printing or an inkjet method.

After an electrode pattern, containing a catalyst layer provided with a monomer polymerizing ability, has been formed on a substrate by use of an inkjet method, a monomer component, which is capable of forming a conductive polymer layer when being polymerized by said catalyst, is applied to polymerize the monomer component, and further, metal plating of such as silver is carried out on said conductive polymer layer, resulting in formation of a metal electrode pattern. Since this method employs no photo-resist or a mask pattern, the manufacturing process can be significantly simplified.

In the case of forming an electrode material by coating, commonly known methods such as a dipping method, a spinner method, a spray method, a roll coater method, a flexography method and a screen printing method can be utilized.

[Electrostatic Inkjet Method]

In a display medium of this invention, at least one type of an electrode is preferably formed by use of a liquid ejection apparatus, which is equipped with a liquid ejection head provided with a nozzle having a diameter of not more than 30 μm to eject a charged liquid, a supply means to supply a solution to the aforesaid nozzle, and an ejection voltage applying means to apply an ejection voltage to the solution in the aforesaid nozzle.

Further, the electrode is preferably formed by use of an ejection apparatus equipped with a convex meniscus forming means so that the solution in the aforesaid nozzle forms a convex rising form from the top of said nozzle.

Further, it is also preferable to utilize a liquid ejection apparatus equipped with an operation control means, which controls application of driving voltage to drive the aforesaid convex meniscus and application of ejection voltage by an ejection voltage control means, and this operation control means being equipped with the first ejection control section, which performs application of drive voltage of the aforesaid meniscus forming means at the time of liquid drop ejection while applying ejection voltage by the aforesaid ejection voltage applying means.

Further, it is also a preferable embodiment to utilize a liquid ejection apparatus equipped with an operation control means, which controls drive of the aforesaid convex meniscus forming means and voltage application by an ejection voltage applying means, wherein this operation control means is provided with the second ejection control section, which synchronously performs the solution rising operation by the aforesaid convex meniscus forming means and the aforesaid ejection voltage application, and the aforesaid operation control means is provided with a liquid surface stabilization control section, which performs rising operation of the aforesaid solution and operation control to draw the liquid surface at the aforesaid nozzle top portion toward inside after ejection voltage application.

By forming an electrode pattern by means of such electrostatic inkjet, an electrode having an excellent on-demand capability, generating small amount of waste materials and being superior in dimensional precision can be prepared.

[Light Shielding Layer]

A display medium of this invention can be provided with a light shielding layer. Light shielding may be provided by a metallic reflective plate, a scattering plate, coating colored paint inside the substrate, or application of a binder constitution layer containing a colored material such as pigment and dye. In this invention, this light shielding layer is preferably provided between a pair of electrodes opposed to each other, and, black display having more increased light absorption efficiency can be performed, for example, by providing a layer in which carbon black is dispersed. Further, in the case of utilizing a resin substrate attached with a transparent electrode, a colored substance can be provided on the surface opposite to a liquid crystal layer of a substrate. Color of light to be shielded may be black in the case of black display and may also be filter color to compensate the reflective color of liquid crystal.

[Display Medium Driving Method]

In a display medium of this invention, a driving operation of the electrodes opposed to each other is preferably simple matrix drive.

Simple matrix drive referred in this invention means a drive method in which electric current is successively applied to a circuit comprising positive lines, including a plural number of positive electrodes, and negative lines, including a plural number of negative electrodes, which are facing to each other and crossing perpendicular to each other. There is a merit of manufacturing at low cost due to simplification of a circuit constitution and a drive IC.

Active matrix drive may be also utilized in a display medium of this invention. Active matrix drive is constituted of scanning lines, data lines and electric current supplying lines which are arranged in a checker form, and is drove by a TFT circuit provided on each checker cross. Since switching by each pixel is possible, there are advantages of gradation and memory functions.

To drive a display medium of this invention, utilized can be a drive circuit and a drive wave form, which are described in, for example, JP-A Nos. 2003-5222, 2003-228045, 2002-14323, 2003-29301 and 2002-287175.

Next, specific constitution examples of a display medium of this invention will be explained referring to drawings, however, this invention is not limited to these exemplified constitutions.

A display medium of this invention is preferably adopts a constitution, in which a binder and a liquid crystal composition dispersed in the binder are arranged between a pair of electrodes.

FIG. 1 is a cross-sectional drawing to show an example of a constitution of a color display medium provided with a plural number of constitution layers containing a liquid crystal compound.

FIG. 1(a) is provided with first electrode 1 and second electrode 6 as a pair of electrodes, and second electrode 6 among them, which is positioned downward in the observation direction, is preferably a transparent electrode.

Three constitution layers 5 are arranged between first electrode 1 and second electrode 6, which are opposed to each other, and constitution layers each contain red light reflecting liquid crystal composition 2, green light reflecting liquid crystal composition 3 and blue light reflecting liquid crystal composition 4, respectively, which are independently dispersed in a binder. Each color reflecting liquid crystal composition can perform color display by suitably adjusting the amount of a chiral dopant, which is added in nematic liquid crystal, and a threshold voltage applied between first electrode 1 and second electrode 6. Further, to eliminate abnormal absorption of each color reflecting liquid crystal composition and to achieve optimum color reproduction, filter layers for color correction are preferably provided between the constitution layers as shown in FIG. 1(b). Further, the position of each color constitution layer of green, blue and red may be appropriately selected depending on spectral characteristics of each liquid crystal composition.

In a display medium of this invention, to contain plural types of liquid crystal compositions in the same constitution layer is one of preferable embodiments.

Figure 2:
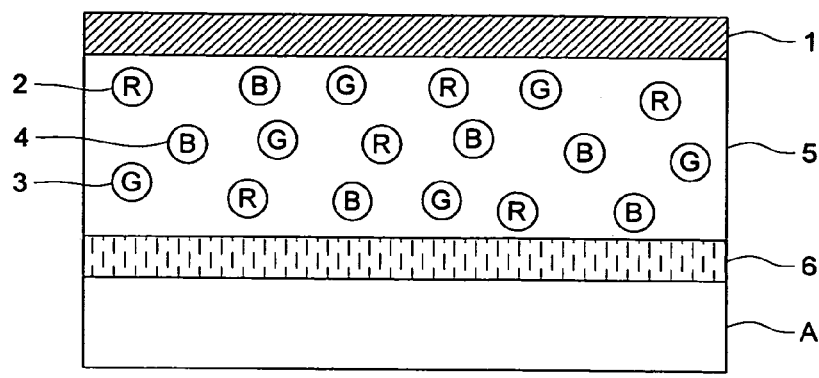
FIG. 2 is a cross-sectional drawing to show a constitution example of a display medium containing light reflecting liquid crystal compositions of three colors in a single constitution layer.
Figure 2:
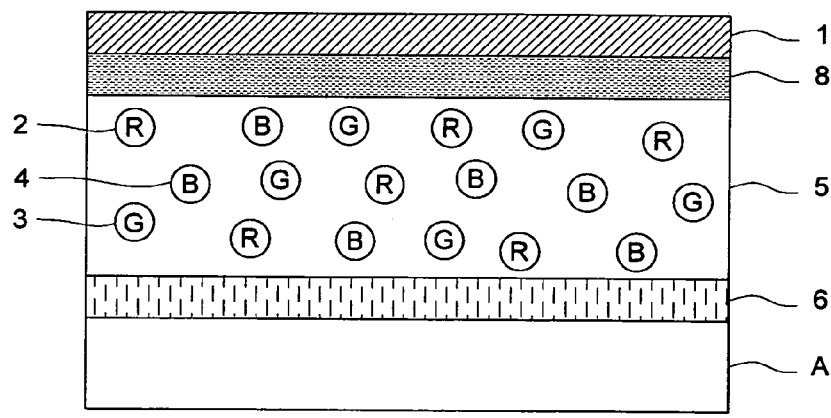
Figure 2:
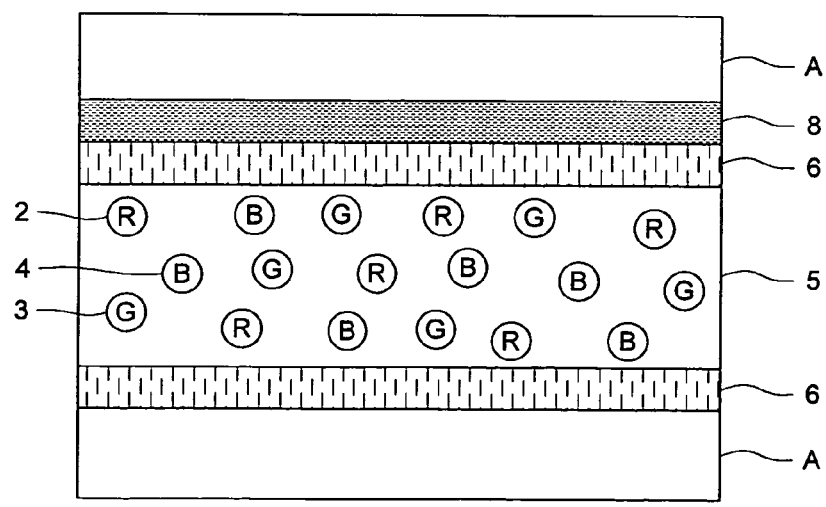

FIG. 2 is a cross-sectional drawing to show an example of a constitution of a display medium, in which a single constitution layer contains light reflecting liquid crystal compositions of three colors.

In a constitution of FIG. 2(a), one of constitution layers 5 is arranged between first electrode 1 and second electrode 6 as a pair of electrodes, and red light reflecting liquid crystal composition 2, green light reflecting liquid crystal composition 3 and blue light reflecting liquid crystal composition 4, which are dispersed in a binder, are contained in this constitution layer 5.

Further, FIG. 2(b) illustrates an embodiment in which a black light shielding layer is arranged between a constitution layer, containing each colored light reflecting liquid crystal composition, and second electrode 1, and it is possible to perform black and white display with more efficient light absorption. Further, FIG. 2(c) shows an embodiment in which a black light shielding layer is provided between second electrode 6 and substrate A.

Figure 3:
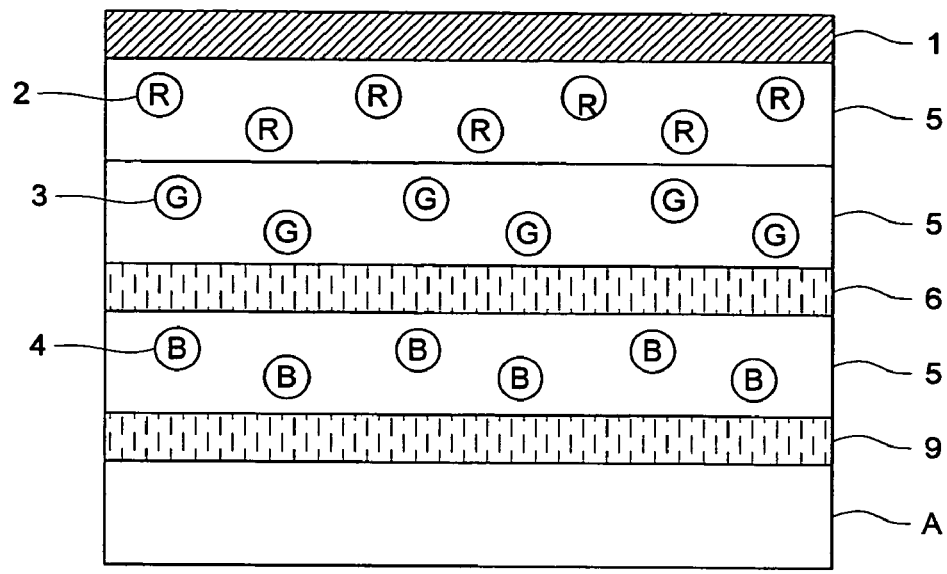
FIG. 3 is a cross-sectional drawing to show a constitution example of a color display medium which is constituted of at least two pairs of electrodes and provided with a plural number of constitution layers containing a liquid crystal compound.
Figure 3:
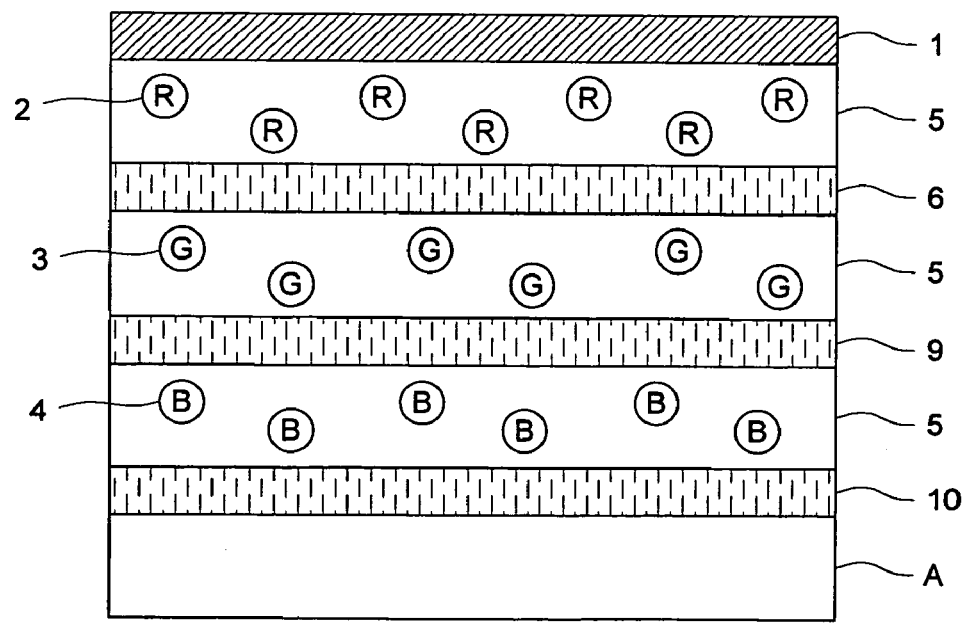

FIG. 3 is a cross-sectional drawing to show a constitution example of a color display medium which is constituted of at least two electrodes and provided with a plural number of constitution layers containing a liquid crystal compound.

FIG. 3(a) is an example of an embodiment, in which, against the constitution of FIG. 1(a), an additional electrode is arranged between a constitution layer containing a green light reflecting liquid crystal composition and a constitution layer containing a blue light reflecting liquid crystal composition, and FIG. 3(b) is an example of a display medium having a constitution in which each constitution layer is sandwiched with a pair of electrodes. Herein, 6, 9 and 10 represent transparent electrodes.

The constitutions of a display medium which were shown in FIGS. 1-3 explained above are preferably applied primarily for color display, although these are also capable of performing black and white display.

Figure 4:
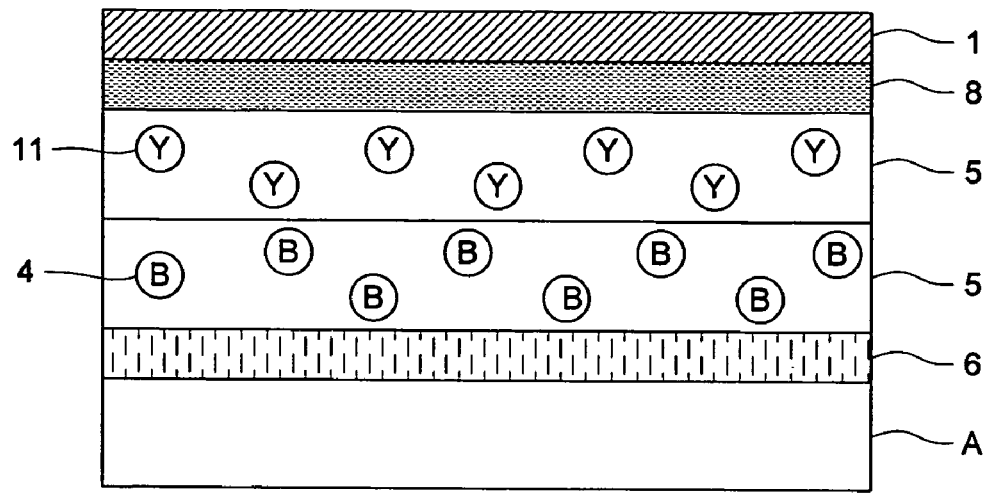
FIG. 4 is a constitutional drawing to show a constitution example of a display medium for black and white display.
Figure 4:
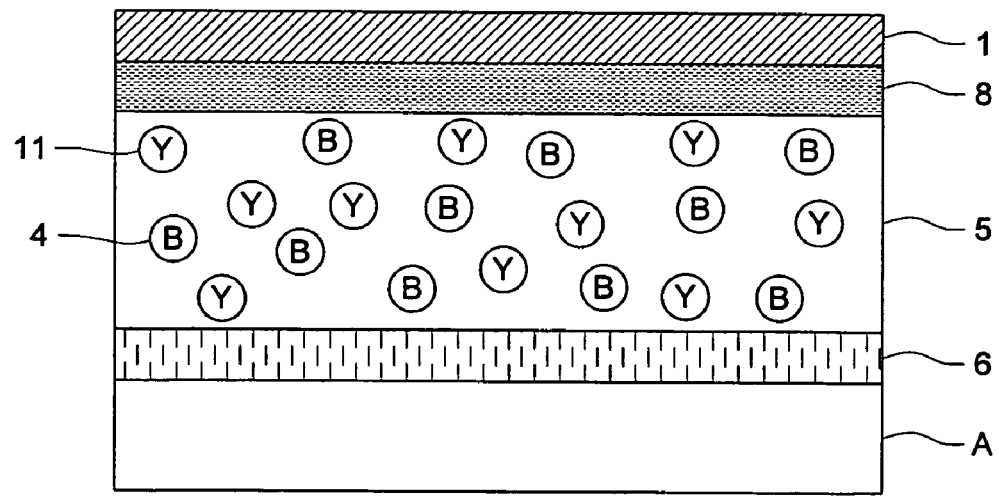

FIG. 4 is a constitutional drawing to show a constitution example of a display medium for black and white display.

In FIG. 4(a), two layers of constitution layers 5 are provided between first electrode 1 and second electrode 6, as a pair of electrodes, blue light reflecting liquid crystal composition 4 being contained in one of layers 5 and yellow light reflecting liquid crystal composition 11, which is in a complimentary color relation to blue light reflecting liquid crystal composition 4, being contained in another layer 5, resulting in providing a method to display white and black. Further, this is an embodiment having a black light shielding layer between first electrode 1 and constitution layer 5, which enables to perform superior black and white display with more efficient light absorption. In FIG. 4(a), an example of black and white display by a combination of blue light reflecting liquid crystal composition 4 and yellow light reflecting liquid crystal composition 11, however, for example, a combination of green light reflecting liquid crystal composition and magenta light reflecting liquid crystal composition, or a combination of red light reflecting liquid crystal composition and cyan light reflecting liquid crystal composition is also possible.

FIG. 4(b) is an embodiment in which blue light reflecting liquid crystal composition 4 and yellow light reflecting liquid crystal composition 11 exist simultaneously in a single layer.

In a display medium of this invention, a chiral nematic liquid crystal composition preferably contains a liquid crystal composition providing selective reflection of dextro-rotatory or levo-rotatory.

FIG. 5 is a cross-sectional drawing to show a constitution example of a black and white display medium containing a liquid crystal composition providing selective reflection of dextro-rotatory or levo-rotatory.

Figure 5A:
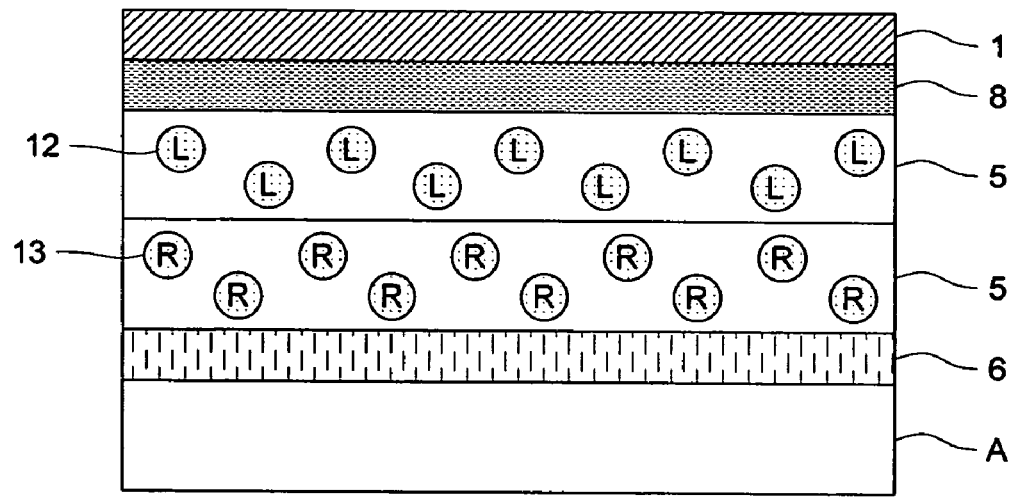
FIG. 5 is a cross-sectional drawing to show a constitution example of a black and white display medium containing a liquid crystal composition providing selective reflection of dextrorotatory or levorotatory.
Figure 5B:
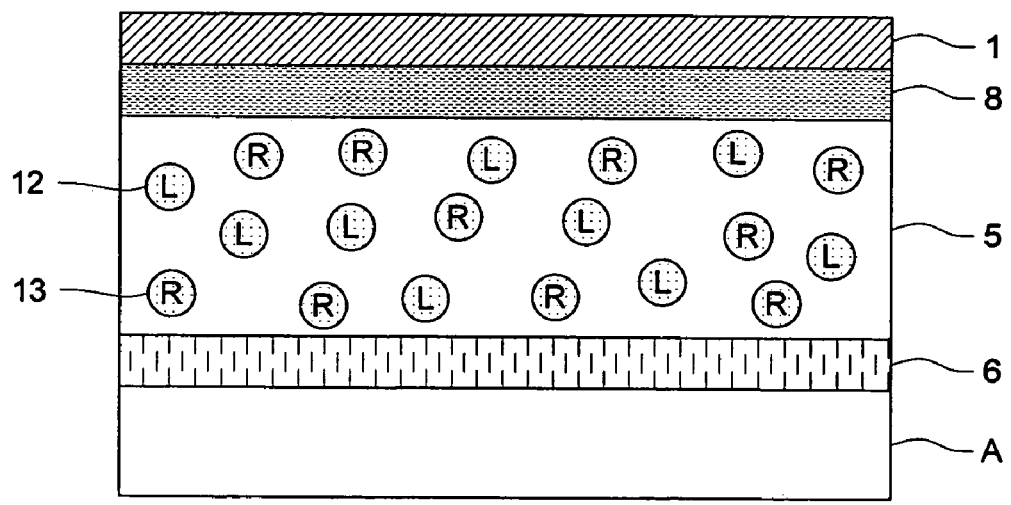

FIG. 5(a) is an example in which liquid crystal composition providing selective reflection of levo-rotatory 12 or liquid crystal composition providing selective reflection of dextro-rotatory 13 is contained in each independent constitution layer, and FIG. 5(b) is an example in which liquid crystal composition providing selective reflection of levo-rotatory 12 and liquid crystal composition providing selective reflection of dextro-rotatory 13 are contained in a single constitution layer; and either thereof is one of embodiments applicable for black and white display.

FIG. 6 is a cross-sectional drawing to show a constitution example of a color display medium containing a liquid crystal composition providing selective reflection of dextro-rotatory or levo-rotatory.

Figure 6A:
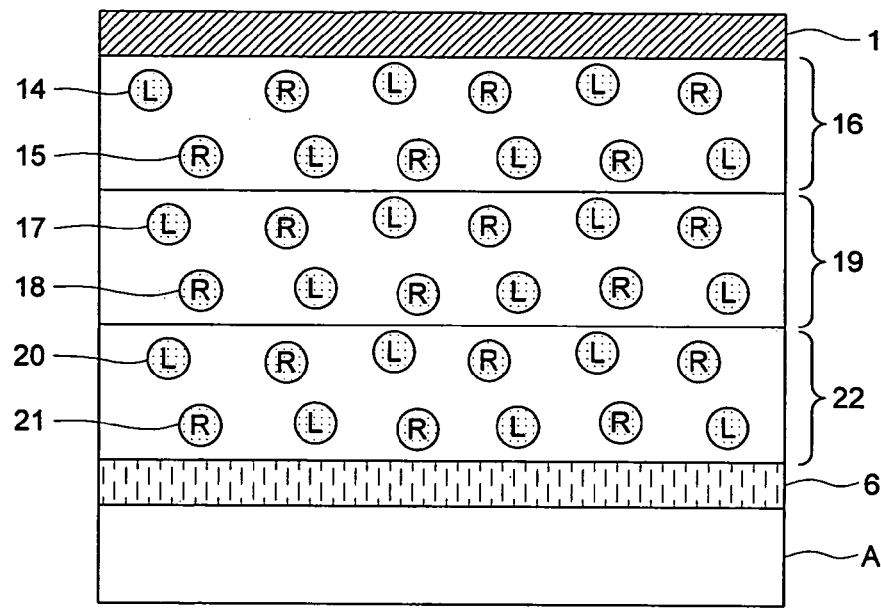
FIG. 6 is a cross-sectional drawing to show a constitution example of a color display medium containing a liquid crystal composition providing selective reflection of dextrorotatory or levorotatory.
Figure 6B:
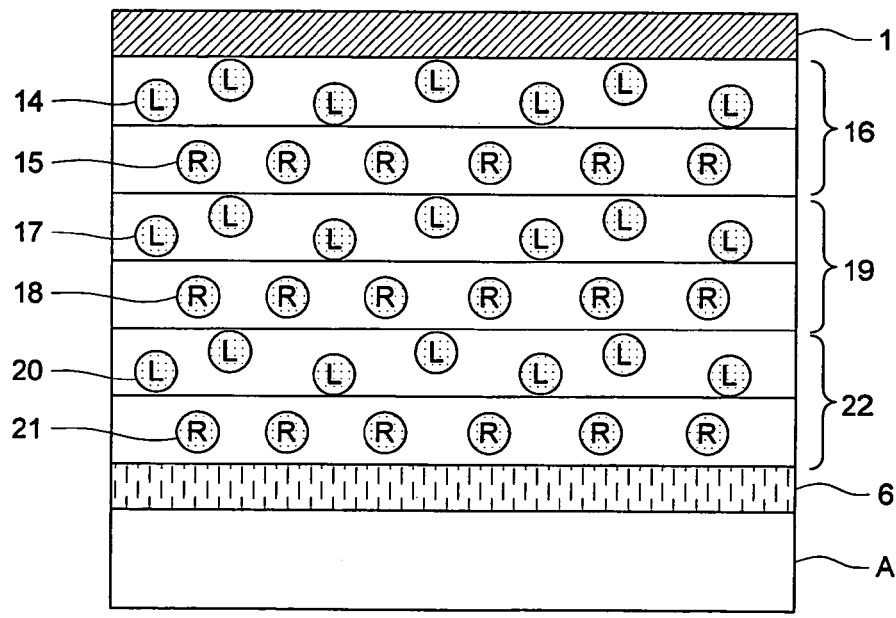

In FIG. 6(a), first electrode 1 and second electrode 6 are provided as a pair of electrodes, and three layers of constitution layers 5 are provided between first electrode 1 and second electrode 6, which are arranged facing to each other, constitution layers are comprised of red reflection layer 16 containing red light reflecting liquid crystal composition 14 of levo-rotatory and red light reflecting liquid crystal composition 15 of dextr-rotatory, which are independently dispersed in a binder, green reflection layer 19 containing green light reflecting liquid crystal composition 17 of levo-rotatory and green light reflecting liquid crystal composition 18 of dextro-rotatory, which are independently dispersed in a binder, and blue reflection layer 22 containing blue light reflecting liquid crystal composition 20 of levo-rotatory and blue light reflecting liquid crystal composition 21 of dextro-rotatory, which are independently dispersed in a binder. FIG. 6(b) shows an example in which each levo-rotatory liquid crystal composition and dextro-rotatory liquid crystal composition, which is dispersed in a binder, is dispersed in an independent constitution layer.

[Application Fields of Display Medium of the Invention]

A display medium of this invention can be utilized in such as an ID card related field, a public related field, a traffic related field, a broadcast related field, a settlement related field and a logistic related field. Specific examples include applications for such as a keys for doors, a student's card, an employee's card, various member's cards, a cards for a convenience store, a card for a department store, a card for a vending machine, a card for a gas station, a card for a subway and a rail way, a bus card, a cash card, a credit card, a high way card, a driver's license, a diagnostic card for a hospital, a health insurance card, a resident basic register, a passport, an electronic book terminal, a document viewer and signs of an information board or a bulletin board.

EXAMPLES

Example 1

(Preparation of Display Medium 1: Comparative Example)

(Preparation of Electrode 1)

After an ITO layer was formed on the whole surface of a polyethylene terephthalate having a thickness of 100 μm by a commonly known spattering method, transparent electrode 1 provided with an electrode pattern having an electrode space of 50 μm and an electrode width of 2 mm was prepared by a lithographic method.

(Preparation of Liquid Crystal Layer Coating Solution 1)

Nematic liquid crystal BL 012 (manufactured by Merck & Co.), which shows positive dielectric isotropy, of 60.0 weight %, dextro-rotatory chiral agent CB 15 (manufactured by Merck & Co.) of 20.0 weight % and dextro-rotatory chiral agent CE 2 (manufactured by Merck & Co.) of 20.0 weight % were sufficiently mixed to prepare dextro-rotatory green light reflecting liquid crystal composition 1.

Next, 8 weight % of gelatin for photographic use was added to ion-exchanged water, and the system was stirred at room temperature and left for 30 minutes to sufficiently swell the gelatin, then the temperature was raised to 42° C. to dissolve the gelatin. Isopropyl alcohol solution 1, containing Alkanol XC (alkylnaphthalene sulfonic acid) as a surfactant, of 12 weight % based on water was added into this solution, followed by being added with 12 weight % based on water of liquid crystal composition 1. This mixed solution was stirred with a comb teeth type disperser while being kept at 42° C., resulting in preparation of liquid crystal layer coating solution 1 containing a liquid crystal dispersion having a mean dispersed particle diameter of 5 μm.

(Preparation of Display Medium)

Liquid crystal layer coating solution 1 being heated at 42° C. was coated on transparent electrode 1 so as to make a layer thickness of 35 μm, and after solidifying the liquid crystal layer coating solution as a jelly-like form by leaving the sample under an environment of 10° C. immediately after having been coated, water content was dried while keeping the jelly-like form. On said sample, in a similar manner, an aqueous solution containing 5 weight % of gelatin was coated and the water content was dried, and further, an aqueous solution containing 20 weight % of carbon black and 5 weight % of gelatin was coated and the water content was dried. On said sample, an electrode pattern, which crosses at a right angle with the electrode pattern of transparent electrode 1, was formed by use of silver paste ink (DW-250H-5, manufactured by Toyobo Co., Ltd.) by a screen printing method resulting in preparation of display medium 1.

(Preparation of Display Medium 2: The Invention)

Display medium 2 was prepared in a similar manner to preparation of display medium 1, except that alumina particles having a mean particle diameter of 30 nm was added into liquid crystal layer coating solution 1 at 5 weight % against gelatin.

(Preparation of Display Medium 3: The Invention)

Display medium 3 was prepared in a similar manner to preparation of display medium 1, except that synthetic mica $(NaLi)Mg_2(Si_4O_{10})F_2$ having a thickness of 0.01 μm and a plane size of 2 μm was added into liquid crystal layer coating solution 1 at 5 weight % against gelatin.

(Preparation of Display Medium 4: The Invention)

Display medium 4 was prepared in a similar manner to preparation of display medium 1, except that example azomethine dye compounds (D-1) of 0.7 mmol/m$^2$, (D-5) of 0.35 mmol/m$^2$ and (D-6) of 0.4 mmol/m$^2$ were added, instead of carbon black.

(Preparation of Display Medium 5: The Invention)

Display medium 4 was prepared in a similar manner to preparation of display medium 1, except that a constitution layer, containing 0.2 g/m$^2$ of example fluorescent whitening agent F15 and 0.7 g/m$^2$ of gelatin, was provided between an ITO film and a liquid crystal layer.

(Preparation of Display Medium 6: The Invention)

Display medium 6 was prepared in a similar manner to preparation of display medium 1, except that a constitution layer, containing 0.3 g/m$^2$ of UV absorbent example compound 1-2 and 0.7 g/m$^2$ of gelatin, was provided between an ITO film and a liquid crystal layer.

(Evaluation Method)

Alternate voltage of 50 Hz and 250 msec period was applied on the both electrodes of a prepared display medium while changing the voltage values, and the reflectivity was measured by use of Spectrophotometer CM-3700d manufactured by Konicaminolta Co., Ltd. The maximum and minimum of the obtained reflectivity were determined and a contrast ratio (=maximum reflectivity/minimum reflectivity) was calculated for comparison.

The evaluation results with respect to display medium 1-6 are shown in table 1.

TABLE 1

| Display element | Maximum reflectivity % | Minimum reflectivity % | Contrast | Remarks |
|---|---|---|---|---|
| 1 | 18.3 | 4.8 | 3.8 | Comparison |
| 2 | 23.6 | 4.0 | 5.9 | Invention |
| 3 | 24.6 | 3.8 | 6.5 | Invention |
| 4 | 19.2 | 4.4 | 4.4 | Invention |
| 5 | 18.8 | 4.2 | 4.5 | Invention |
| 6 | 19.1 | 4.1 | 4.7 | Invention |

Reflectivity at 550 nm

It is clear, from the results described in table 1, that display media satisfying the constitution of this invention exhibit an increased contrast ratio to improve optical characteristics.

Example 2

(Preparation of Liquid Crystal Layer Coating Solution 2)

Liquid crystal layer coating solution 2 of dextro-rotatory yellow light reflective was prepared in a similar manner to preparation of liquid crystal layer coating solution 1, except that liquid crystal composition 1 was changed to liquid crystal composition 2 containing nematic liquid crystal E 44 (manufactured by Merck & Co.) and BL 011 (manufactured by Merck & Co.), which show positive dielectric isotropy, of 44.05 weight % and 19.05 weight % respectively, and dextro-rotatory chiral agent CB 15 (manufactured by Merck & Co.) of 36.5 weight %.

(Preparation of Liquid Crystal Layer Coating Solution 3)

Liquid crystal layer coating solution 3 of dextro-rotatory blue light reflective was prepared in a similar manner to preparation of liquid crystal layer coating solution 1, except that liquid crystal composition 1 was changed to liquid crystal composition 3 containing nematic liquid crystal E 44 (manufactured by Merck & Co.) and BL 011 (manufactured by Merck & Co.), which show positive dielectric isotropy, of 35.35 weight % and 15.15 weight % respectively, and dextro-rotatory chiral agent CB 15 (manufactured by Merck & Co.) of 49.5 weight %.

(Preparation of Liquid Crystal Layer Coating Solution 4)

Liquid crystal layer coating solution 4 was prepared by mixing liquid crystal layer coating solution 2 and liquid crystal layer coating solution 3 at a weight ratio of 1/1.3.

Display medium 7-12 were prepared in a similar manner to example 1, except that liquid crystal layer coating solution 1 is changed to liquid crystal layer coating solution 4, and the evaluation similar to example 1 was performed. The evaluation results are shown in table 2.

TABLE 2

| Display element | Maximum reflectivity % | Minimum reflectivity % | Contrast | Remarks |
|---|---|---|---|---|
| 7 | 17.8 | 4.6 | 3.9 | Comparison |
| 8 | 22.0 | 4.1 | 5.4 | Invention |
| 9 | 23.8 | 4.0 | 6.0 | Invention |
| 10 | 19.9 | 4.3 | 4.6 | Invention |
| 11 | 19.1 | 4.2 | 4.5 | Invention |
| 12 | 18.5 | 4.1 | 4.5 | Invention |

Reflectivity at 550 nm

It is clear, from the results described in table 2, that display medium satisfying the constitution of this invention exhibit an increased contrast ratio to improve optical characteristics.

Example 3

(Preparation of Liquid Crystal Layer Coating Solution 5)

Nematic liquid crystal BL 012 (manufactured by Merck & Co.), which shows positive dielectric isotropy, of 69.0 weight %, dextro-rotatory chiral agent CB 15 (manufactured by Merck & Co.) of 15.5 weight % and dextro-rotatory chiral agent CE 2 (manufactured by Merck & Co.) of 15.5 weight % were mixed to prepare liquid crystal composition 4.

Next, 4 weight % against ion-exchanged water of gelatin for photographic use and 1 weight % against water of gum arabi were added, and the system was stirred at room temperature and left for 30 minutes to sufficiently swell gelatin and gum arabi, then the temperature was raised to 42° C., resulting in preparation of gelatin aqueous solution 2. Isopropyl alcohol solution 1 containing 10 weight % of Alkanol XC (alkylnaphthalene sulfonic acid) of 12 weight % against water content of gelatin solution 2 was added into this gelatin solution 2, followed by being added with 10 weight %, based on water content of gelatin aqueous solution 2, of liquid crystal composition 2. This mixed solution was stirred with a comb teeth type disperser while being kept at 42° C., resulting in preparation of liquid crystal dispersion having a mean dispersed particle diameter of 5 μm. Said liquid crystal dispersion, pH of which having been adjusted to 4.5, was stirred for 30 minutes, and thereafter, the temperature of which was cooled down to 8° C., followed by being stirred for another 30 minutes. After this solution was added with 15 mg, based on 1 g of gelatin, of sodium salt of 2,4-dichloro-6-hydroxy-s-triazine and stirred for 5 minutes, the solution, pH of which having been raised to 9.0, was stirred for another 30 minutes. Next, temperature of this solution was raised to 30° C. and stirred for 20 minutes, resulting in preparation of a micro-capsule solution containing liquid crystal composition 2. This micro-capsule solution was added with a gelatin solution so as to make a gelatin concentration of 8 weight %, resulting in preparation of liquid crystal layer coating solution 5 containing micro-capsules which includes a red light reflecting liquid crystal composition.

(Preparation of Liquid Crystal Layer Coating Solution 6)

Liquid crystal layer coating solution 6, which contains micro-capsules including a green light reflecting liquid crystal composition, was prepared in a similar manner to preparation of liquid crystal layer coating solution 5, except that liquid crystal composition 4 was changed to liquid crystal composition 1.

(Preparation of Liquid Crystal Layer Coating Solution 7)

Liquid crystal layer coating solution 7, which contains micro-capsules including a blue light reflecting liquid crystal composition, was prepared in a similar manner to preparation of liquid crystal layer coating solution 5, except that liquid crystal composition 4 was changed to liquid crystal composition 3 of liquid crystal layer coating solution 3.

(Preparation of Liquid Crystal Layer Coating Solution 8)

Liquid crystal layer coating solution 8 was prepared by mixing liquid crystal layer coating solutions 5, 6 and 7 at a weight ratio of 1/1/1. Display medium 13-18 were prepared in a similar manner to example 1, except that liquid crystal layer coating solution 1 was changed to liquid crystal layer coating solution 8, and evaluations similar to example 1 were performed. The evaluation results are shown in table 3.

TABLE 3

| Display element | Maximum reflectivity % | Minimum reflectivity % | Contrast | Remarks |
|---|---|---|---|---|
| 13 | 16.9 | 5.0 | 3.4 | Comparison |
| 14 | 21.8 | 3.9 | 5.6 | Invention |
| 15 | 22.8 | 3.8 | 6.0 | Invention |
| 16 | 19.5 | 4.2 | 4.6 | Invention |
| 17 | 18.9 | 4.3 | 4.4 | Invention |
| 18 | 18.5 | 4.4 | 4.2 | Invention |

Reflectivity at 550 nm

It is clear, from the results described in table 3, that display medium satisfying the constitution of this invention exhibit an increased contrast ratio to improve optical characteristics.

Further, a sample, in which liquid crystal layer coating solutions 5, 6 and 7 each were accumulating coated as separate layers in stead of coating liquid crystal layer coating solution 8, was prepared, to obtain an effect similar to that of table 3.

Example 4

Liquid crystal layer coating solution 9 was prepared in a similar manner to preparation of liquid crystal layer coating solution 2, except that liquid crystal composition 2 was changed to nematic liquid crystal BL 012 (manufactured by Merck & Co.) of 77.0 weight % and dextro-rotatory chiral agent CNL-611R (manufactured by Asahi Denka Kogyo Co., Ltd.) of 23.0 weight %.

Liquid crystal layer coating solution 10 was prepared in a similar manner to preparation of liquid crystal layer coating solution 3, except that liquid crystal composition 3 was changed to nematic liquid crystal BL 012 (manufactured by Merck & Co.) of 77.0 weight % and dextro-rotatory chiral agent CNL-617L (manufactured by Asahi Denka Kogyo-Co., Ltd.) of 23.0 weight %.

Liquid crystal layer coating solution 11 was prepared by mixing liquid crystal layer coating solutions 9 and 10 at a weight ratio of 1/1.

An evaluation similar to example 1 was performed except that liquid crystal layer coating solution 1 was changed to liquid crystal layer coating solution 11, to obtain an effect similar to that of example 1.

Example 5

The liquid crystal composition of example 1 was changed to the liquid crystal composition described in paragraph Nos. 0081-0082 of JP-A No. 5-273576, to measure phase transition voltage and reflectivity of the liquid crystal and perform an evaluation similar to example 1. It has been proved that samples, which employ a constitution of this invention, exhibit a small variation ratio of phase transition voltage to obtain an effect of this invention even with other than cholesteric liquid crystal.

Example 6

A sample, in which an electrode pattern similar to that of example 1 was formed by utilizing a solution containing silver colloidal particles having a mean particle diameter of 20 nm and by use of an electrostatic inkjet apparatus having an ejection nozzle top diameter of 15 μm, instead of screen printing of silver paste, was prepared and evaluation similar to example 1 was performed to obtain an effect of this invention similar to example 1.

While the preferred embodiments of the present invention have been described using specific terms, such description is for illustrative purposes only, and it is to be understood that changes and variations may be made without departing from the spirit or scope of the appended claims.

What is claimed is:

1. A rewritable display comprising a substrate having thereon one or more constitution layers,
  one of the constitution layers being a liquid crystal layer containing a liquid crystal composition which is dispersed in a binder,
  and one of the constitution layers containing a compound selected from the group consisting of:
  (a) alumina particles;
  (b) a layer structured inorganic compound, wherein the layer structured inorganic compound comprises at least one mineral selected from the group consisting of synthetic mica, smectites, bentonite, hectorite, saponite, bedelite, nontronite, stevensite, videlite, and monmolironite;
  (c) an azomethine dye compound represented by Formula D:

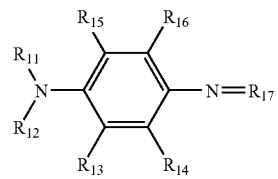

wherein $R_{11}$ to $R_{17}$ is a hydrogen atom or a substituent,
(d) a fluorescent brightening agent; and
(e) a ultraviolet absorber.

2. The rewritable display of claim 1,
wherein the liquid crystal composition is a chiral nematic liquid crystal composition having a cholesteric phase.

3. The rewritable display of claim 2,
wherein the chiral nematic liquid crystal composition selectively reflects one of lights selected from the group consisting of blue light, green light, red light and yellow light.

4. The rewritable display of claim 2,
wherein the chiral nematic liquid crystal composition exhibits selective reflection of dextrorotary or levorotatory.

5. The rewritable display of claim 1,
wherein the liquid crystal layer comprises a plurality of liquid crystals.

6. The rewritable display of claim 1,
comprising a multiplicity of liquid crystal layers on the substrate.

7. The rewritable display of claim 1,
wherein the liquid crystal composition is encapsulated with a microcapsule wall.

8. The rewritable display of claim 1,
further comprises a pair of counter electrodes which sandwich the liquid crystal layer therebetween.

9. The rewritable display of claim 1,
further comprises a light shielding layer.

10. The rewritable display of claim 9,
wherein the light shielding layer is provided between the pair of counter electrodes.

11. The rewritable display of claim 8,
wherein at least one of the counter electrodes is formed by an electrostatic induction ink-jet apparatus having a nozzle diameter of not more than 30 μm.

12. The rewritable display of claim 1, wherein the constitution layers satisfy at least one of the following requirements:
   (i) the liquid crystal layer contains (a) the alumina particles or (b) the layer structured inorganic compound;
   (ii) one of the constitution layers having no liquid crystal composition contains (c) the azomethine dye represented by Formula (D); or
   (iii) one of the constitution layers located at a farther position from the substrate than the liquid crystal layer contains (d) the fluorescent brightening agent or (e) the ultraviolet absorber.

13. The rewritable display of claim 1, wherein the constitution layers satisfy all of the following requirements:
   (i) the liquid crystal layer contains (a) the alumina particles or (b) the layer structured inorganic compound;
   (ii) one of the constitution layers having no liquid crystal composition contains (c) the azomethine dye represented by Formula (D); or
   (iii) one of the constitution layers located at a farther position from the substrate than the liquid crystal layer contains (d) the fluorescent brightening agent or (e) the ultraviolet absorber.

14. A rewritable display comprising a substrate having thereon one or more constitution layers,
   one of the constitution layers being a liquid crystal layer containing a liquid crystal composition which is dispersed in a binder,
   and one of the constitution layers comprising alumina particles.

* * * * *